US012777146B2

(12) United States Patent
Lee et al.

(10) Patent No.: US 12,777,146 B2
(45) **Date of Patent: *Oct. 27, 2026**

(54) METHOD AND DEVICE FOR ENCODING/DECODING IMAGE, AND RECORDING MEDIUM IN WHICH BITSTREAM IS STORED

(71) Applicant: LX Semicon Co., Ltd., Daejeon (KR)

(72) Inventors: Jin Ho Lee, Daejeon (KR); Jung Won Kang, Daejeon (KR); Hyun Suk Ko, Daejeon (KR); Sung Chang Lim, Daejeon (KR); Ha Hyun Lee, Seoul (KR); Dong San Jun, Daejeon (KR); Hui Yong Kim, Daejeon (KR)

(73) Assignee: LX SEMICON CO., LTD, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,653

(22) Filed: Jan. 17, 2025

(65) Prior Publication Data

US 2025/0168328 A1 May 22, 2025

Related U.S. Application Data

(63) Continuation of application No. 18/888,727, filed on Sep. 18, 2024, now Pat. No. 12,519,934, which is a (Continued)

(30) Foreign Application Priority Data

Jul. 6, 2017 (KR) ........................ 10-2017-0086113
Dec. 13, 2017 (KR) ........................ 10-2017-0171377

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/117* (2014.11); *H04N 19/176* (2014.11); *H04N 19/593* (2014.11)

(58) Field of Classification Search
None
See application file for complete search history.

(56) References Cited

U.S. PATENT DOCUMENTS 8,787,456 B2 7/2014 Murakami et al.
9,374,578 B1 6/2016 Mukherjee et al.
(Continued)

FOREIGN PATENT DOCUMENTS

CN 1784015 A 6/2006
CN 1812582 A 8/2006
(Continued)

OTHER PUBLICATIONS

Indian Office Action for Indian Application No. 202418015544, dated Sep. 30, 2025, with English translation.
(Continued)

*Primary Examiner* — Peter D Le
(74) *Attorney, Agent, or Firm* — Birch, Stewart, Kolasch & Birch, LLP

(57) ABSTRACT

An image encoding/decoding method and apparatus for performing intra prediction using a plurality of reference sample lines are provided. The image decoding method can include receiving partition information for a coding tree unit and size information, partitioning a split target block in the coding tree unit into a plurality of coding units based on the partition information, and performing intra prediction for each of the plurality of coding units.

3 Claims, 12 Drawing Sheets

Related U.S. Application Data continuation of application No. 18/222,566, filed on Jul. 17, 2023, now Pat. No. 12,143,576, which is a continuation of application No. 16/628,850, filed as application No. PCT/KR2018/007016 on Jun. 21, 2018, now Pat. No. 11,743,456.

(51) Int. Cl.
*H04N 19/117* (2014.01)
*H04N 19/176* (2014.01)
*H04N 19/593* (2014.01)

(56) References Cited

U.S. PATENT DOCUMENTS

| | | | | |
|---|---|---|---|---|
| 9,609,343 | B1 | 3/2017 | Chen et al. | |
| 10,003,820 | B2 | 6/2018 | Lee et al. | |
| 10,390,021 | B2 | 8/2019 | Xu et al. | |
| 10,721,479 | B2 | 7/2020 | Heo et al. | |
| 10,750,174 | B2 | 8/2020 | Lee et al. | |
| 10,965,938 | B2 * | 3/2021 | Urban | H04N 19/147 |
| 11,234,015 | B2 | 1/2022 | Lee | |
| 11,265,578 | B2 | 3/2022 | Choi et al. | |
| 11,722,664 | B2 * | 8/2023 | Yasugi | H04N 19/119 375/240.02 |
| 11,743,456 | B2 | 8/2023 | Lee et al. | |
| 2004/0190632 | A1 | 9/2004 | Cismas | |
| 2005/0013376 | A1 | 1/2005 | Dattani et al. | |
| 2006/0126962 | A1 | 6/2006 | Sun | |
| 2008/0094505 | A1 | 4/2008 | Pai et al. | |
| 2008/0130754 | A1 | 6/2008 | Winger | |
| 2010/0027655 | A1 | 2/2010 | Matsuo et al. | |
| 2010/0091860 | A1 | 4/2010 | Anisimov | |
| 2011/0007979 | A1 | 1/2011 | Goma | |
| 2011/0249754 | A1 | 10/2011 | Karczewicz et al. | |
| 2011/0299788 | A1 | 12/2011 | Suzuki et al. | |
| 2012/0177113 | A1 | 7/2012 | Guo et al. | |
| 2012/0243608 | A1 | 9/2012 | Yu et al. | |
| 2012/0287995 | A1 | 11/2012 | Budagavi | |
| 2012/0300838 | A1 | 11/2012 | Ma et al. | |
| 2012/0328013 | A1 | 12/2012 | Budagavi et al. | |
| 2013/0022119 | A1 | 1/2013 | Chien et al. | |
| 2013/0039422 | A1 | 2/2013 | Kirchhoffer et al. | |
| 2013/0044814 | A1 | 2/2013 | Guo et al. | |
| 2013/0089149 | A1 | 4/2013 | Hayashi et al. | |
| 2013/0114707 | A1 | 5/2013 | Seregin et al. | |
| 2013/0136174 | A1 | 5/2013 | Xu et al. | |
| 2013/0182761 | A1 | 7/2013 | Chen et al. | |
| 2013/0229485 | A1 | 9/2013 | Rusanovskyy et al. | |
| 2013/0251038 | A1 | 9/2013 | Yokoyama et al. | |
| 2013/0259128 | A1 | 10/2013 | Song et al. | |
| 2013/0301720 | A1 | 11/2013 | Lee et al. | |
| 2013/0322530 | A1 | 12/2013 | Rossato et al. | |
| 2013/0336591 | A1 | 12/2013 | Jeon et al. | |
| 2014/0003495 | A1 | 1/2014 | Chuang et al. | |
| 2014/0010305 | A1 | 1/2014 | Mironovich et al. | |
| 2014/0079332 | A1 | 3/2014 | Zheng | |
| 2014/0092983 | A1 | 4/2014 | Joshi et al. | |
| 2014/0153646 | A1 | 6/2014 | Yang et al. | |
| 2014/0198855 | A1 | 7/2014 | Sole Rojals et al. | |
| 2014/0205000 | A1 | 7/2014 | Lee et al. | |
| 2014/0226717 | A1 | 8/2014 | Lim et al. | |
| 2014/0233650 | A1 | 8/2014 | Zhang et al. | |
| 2014/0355667 | A1 * | 12/2014 | Lei | H04N 19/59 375/240.02 |
| 2015/0063438 | A1 | 3/2015 | Kim et al. | |
| 2015/0063460 | A1 | 3/2015 | Gamei et al. | |
| 2015/0078447 | A1 | 3/2015 | Gamei et al. | |
| 2015/0201213 | A1 | 7/2015 | Suzuki et al. | |
| 2015/0208092 | A1 | 7/2015 | Lee et al. | |
| 2015/0358618 | A1 | 12/2015 | Kim et al. | |
| 2015/0373349 | A1 | 12/2015 | Zhang et al. | |
| 2016/0021382 | A1 | 1/2016 | Lee et al. | |
| 2016/0073132 | A1 | 3/2016 | Zhang et al. | |
| 2016/0219283 | A1 | 7/2016 | Chen et al. | |
| 2016/0234498 | A1 | 8/2016 | Misra et al. | |
| 2016/0309184 | A1 | 10/2016 | Choe et al. | |
| 2016/0330477 | A1 | 11/2016 | Kim et al. | |
| 2016/0381385 | A1 | 12/2016 | Ugur | |
| 2017/0099490 | A1 | 4/2017 | Seregin et al. | |
| 2017/0208336 | A1 | 7/2017 | Li et al. | |
| 2017/0347102 | A1 | 11/2017 | Panusopone et al. | |
| 2017/0353719 | A1 | 12/2017 | Liu et al. | |
| 2018/0041768 | A1 | 2/2018 | Koo et al. | |
| 2018/0048896 | A1 | 2/2018 | Park et al. | |
| 2018/0139453 | A1 | 5/2018 | Park et al. | |
| 2018/0160113 | A1 | 6/2018 | Jeong et al. | |
| 2018/0332284 | A1 | 11/2018 | Liu et al. | |
| 2018/0332288 | A1 | 11/2018 | Hsiang et al. | |
| 2018/0343469 | A1 | 11/2018 | Jin et al. | |
| 2019/0052886 | A1 | 2/2019 | Chiang et al. | |
| 2019/0068967 | A1 | 2/2019 | Ikai et al. | |
| 2019/0075328 | A1 * | 3/2019 | Huang | H04N 19/70 |
| 2019/0116381 | A1 | 4/2019 | Lee et al. | |
| 2019/0124339 | A1 | 4/2019 | Young | |
| 2019/0141318 | A1 | 5/2019 | Li et al. | |
| 2019/0158835 | A1 | 5/2019 | Lee | |
| 2019/0166375 | A1 | 5/2019 | Jun et al. | |
| 2019/0208199 | A1 | 7/2019 | Cho et al. | |
| 2019/0238835 | A1 | 8/2019 | Lee | |
| 2019/0320200 | A1 | 10/2019 | Heo | |
| 2019/0364279 | A1 | 11/2019 | Yasugi et al. | |
| 2020/0021828 | A1 | 1/2020 | Cho et al. | |
| 2020/0021841 | A1 | 1/2020 | Leontaris et al. | |
| 2020/0036985 | A1 | 1/2020 | Jang et al. | |
| 2020/0036992 | A1 | 1/2020 | Lim et al. | |
| 2020/0137424 | A1 | 4/2020 | Zhao et al. | |
| 2020/0204799 | A1 | 6/2020 | Lee et al. | |
| 2020/0204824 | A1 | 6/2020 | Lai et al. | |

FOREIGN PATENT DOCUMENTS

| | | | |
|---|---|---|---|
| CN | 101854549 | A | 10/2010 |
| CN | 102098519 | A | 6/2011 |
| CN | 102648631 | A | 8/2012 |
| CN | 102939761 | A | 2/2013 |
| CN | 102970526 | A | 3/2013 |
| CN | 103096057 | A | 5/2013 |
| CN | 103108187 | A | 5/2013 |
| CN | 103119945 | A | 5/2013 |
| CN | 103200401 | A | 7/2013 |
| CN | 103238333 | A | 8/2013 |
| CN | 103238334 | A | 8/2013 |
| CN | 103404151 | A | 11/2013 |
| CN | 103416066 | A | 11/2013 |
| CN | 103621079 | A | 3/2014 |
| CN | 103650512 | A | 3/2014 |
| CN | 103782595 | A | 5/2014 |
| CN | 103918269 | A | 7/2014 |
| CN | 103931186 | A | 7/2014 |
| CN | 103988506 | A | 8/2014 |
| CN | 104137549 | A | 11/2014 |
| CN | 104247425 | A | 12/2014 |
| CN | 104935945 | A | 9/2015 |
| CN | 105141957 | A | 12/2015 |
| CN | 105208383 | A | 12/2015 |
| CN | 105684442 | A | 6/2016 |
| CN | 103096066 | B | 9/2017 |
| CN | 104737537 | B | 9/2018 |
| EP | 2 699 000 | A1 | 2/2014 |
| EP | 2 858 367 | A2 | 4/2015 |
| EP | 2920964 | B1 | 5/2018 |
| EP | 3361726 | A1 | 8/2018 |
| JP | 2013-34163 | A | 2/2013 |
| JP | 2013-141187 | A | 7/2013 |
| JP | 2015-8341 | A | 1/2015 |
| KR | 10-2007-0077609 | A | 7/2007 |
| KR | 10-2009-0110336 | A | 10/2009 |
| KR | 10-2012-0061035 | A | 6/2012 |
| KR | 10-2012-0112037 | A | 10/2012 |
| KR | 10-2013-0020511 | A | 2/2013 |
| KR | 10-2013-0029130 | A | 3/2013 |
| KR | 10-2013-0049707 | A | 5/2013 |
| KR | 10-2013-0106337 | A | 9/2013 |

(56) References Cited

FOREIGN PATENT DOCUMENTS

| | | | |
|---|---|---|---|
| KR | 10-2014-0008503 | A | 1/2014 |
| KR | 10-2014-0080498 | A | 6/2014 |
| KR | 10-2014-0124442 | A | 10/2014 |
| KR | 10-2014-0129423 | A | 11/2014 |
| KR | 10-2015-0038688 | A | 4/2015 |
| KR | 10-2015-0048637 | A | 5/2015 |
| KR | 10-2015-0070848 | A | 6/2015 |
| KR | 10-1597052 | B1 | 2/2016 |
| KR | 10-2016-0066743 | A | 6/2016 |
| KR | 10-2016-0143586 | A | 12/2016 |
| KR | 10-2016-0143588 | A | 12/2016 |
| KR | 10-2017-0077203 | A | 7/2017 |
| KR | 10-2017-0084055 | A | 7/2017 |
| KR | 10-2018-0068334 | A | 6/2018 |
| TW | 201717626 | A | 5/2017 |
| WO | WO2012/119571 | A1 | 9/2012 |
| WO | WO2012/141500 | A2 | 10/2012 |
| WO | WO 2012/165040 | A1 | 12/2012 |
| WO | WO 2012/175003 | A1 | 12/2012 |
| WO | WO 2012/175646 | A1 | 12/2012 |
| WO | WO 2013/005962 | A2 | 1/2013 |
| WO | WO 2013/005962 | A3 | 1/2013 |
| WO | WO 2013/065678 | A1 | 5/2013 |
| WO | WO 2013/069972 | A1 | 5/2013 |
| WO | WO 2013/160693 | A2 | 10/2013 |
| WO | WO2014/005500 | A1 | 1/2014 |
| WO | WO 2014/039802 | A2 | 3/2014 |
| WO | WO 2014/154094 | A1 | 10/2014 |
| WO | WO2016/072775 | A1 | 5/2016 |
| WO | WO2016/072777 | A1 | 5/2016 |
| WO | WO 2016/074147 | A1 | 5/2016 |
| WO | WO 2016/090568 | A1 | 6/2016 |
| WO | WO 2016/091161 | A1 | 6/2016 |
| WO | WO 2016/154008 | A1 | 9/2016 |
| WO | WO 2016/155641 | A1 | 10/2016 |
| WO | WO2016/195460 | A1 | 12/2016 |
| WO | WO 2017/008263 | A1 | 1/2017 |
| WO | 2017/030270 | A1 | 2/2017 |
| WO | 2017/039256 | A1 | 3/2017 |
| WO | 2017/059926 | A1 | 4/2017 |
| WO | WO 2017/082670 | A1 | 5/2017 |
| WO | 2017/105097 | A1 | 6/2017 |
| WO | 2017/105141 | A1 | 6/2017 |
| WO | WO 2017/088170 | A1 | 6/2017 |
| WO | WO 2017/088810 | A1 | 6/2017 |
| WO | WO 2017/090957 | A1 | 6/2017 |
| WO | WO 2017/090993 | A1 | 6/2017 |
| WO | WO 2019/009540 | A1 | 1/2019 |

OTHER PUBLICATIONS

Chang et al., "Arbitrary Reference Tier for Intra Directional Modes" Joint Video Exploration Team (JVET) of ITU-T SG WP 3 and ISO/IEC JTC 1/SC 29IWG 11 3rd Meeting: Geneva, CH, May 26-Jun. 1, 2016 JVET-C0043rl pp. 1-5 (5 pages in English, 2 pages in Chinese).

Chang et al., "Arbitrary Reference Tier for Intra Directional Modes," ITRI Internatinal, Jun. 2016, pp. 1-7 (7 pages in English).

Chang et al., "Arbitrary reference tier for intra directional modes," Joint Video Exploration Team (JVET) of ITU-T and ISO/IEC, JVET of ITU-T and ISO/IEC, JVET-C0043, 3rd Meeting: Geneva, CH, May 26-Jun. 1, 2016, 5 pages.

Chang et al., "EE6: Arbitrary Reference Tier for Intra Directional Modes, with Supplementary Results," Joint Video Exploration Team (JVET) of ITU-T SG 16 WP 3 and ISO/IEC JTC 1/SC 29/WG 11, JVET-D0099r2, 4th Meeting: Chengdu, CN, Oct. 15-21, 2016, 6 pages.

Chang et al., "EE6: Arbitrary Reference Tier for Intra Directional Modes," with Supplementary Results, ITRI International, Oct. 2016, pp. 1-8 (8 pages in English).

Chen et al., "Algorithm Description of Joint Exploration Test Model 3," Joint Video Exploration Team (JVET) of ITU-T SG 16 WP 3 and ISO/EC JTC 1/SC 29iWG 11 3rd Meeting: Geneva, CH, May 26-Jun. 1, 2016 JVET-C1001v1 pp. 6-7 (2 pages in English, 2 pages in Chinese).

Hsu et al., "Description of SDR video coding technology proposal by Media Tek," Joint Video Experts Team (JVET) of ITU-T and ISO/IEC, JVET-J0018, 10th Meeting: San Diego, US, Apr. 10-20, 2018, 64 pages.

International Preliminary Report on Patentability in International Application No. PCT/KR2018/007016, issued on Jan. 7, 2020, 17 pages (with English translation).

International Search Report conducted on Sep. 18, 2018 in Corresponding International Patent Application No. PCT/KR2018/007016 (4 pages in English).

Li et al., "Multiple Line-Based intra Prediction," Joint Video Exploration Team (JVET) of ITU-T SG 16 WP 3 and ISO/IEC JTC 1/SC 29iWG 11 3rd Meeting: Geneva, CH, May 26-Jun. 2016 JVET-C0071 pp. 1-6 (6 pages in English, 2 pages in Chinese).

Li et al., "Multi-Type-Tree," Joint Video Exploration Team (JVET) of ITU-T and ISO/IEC, JVET-DO117rl, 4th Meeting: Chengdu, CN, Oct. 15-21, 2016, 3 pages.

Matsuo et al, "Improved Intra Angular Prediction by DCT-Based Interpolation Filter," 20th European Signal Processing Conference (EUSIPCO 2012), IEEE, NTT Cyber Space Laboratories, NTT Corporation, Aug. 27-31, 2012, pp. 1-5.

Matsuo et al., "Intra Prediction with Spatial Gradients and Multiple Reference Lines," 2009 Picture Coding Symposium, May 2009, 161-164, 4 pages.

Ye et al., "Alogrithm descriptions of projection format conversion and video quality metrics in 360Lib Version 5," Joint Video Exploration Team (JVET) of ITU-T SG 16 WP 3 and ISO/IEC JTC 1/SC 29/WG 11, Oct. 2017, (6 pages in English).

Zhang et al., "Chroma Intra Prediction Based on Inter-Channel Correlation for HEVC," IEEE Transactions on Image Processing, Jan. 2014, 23(1): 274-286.

Zhang et al., "Enhanced Cross-component Linear Model Intra-prediction," Joint Video Exploration Team (JVET) of ITU-T and ISO/IEC, JVET-D0110, 4th Meeting: Chengdu, CN, Oct. 15-21, 2016, 6 pages.

Cha et al., "An Efficient Combined Inter and Intra Prediction Scheme for Video Coding," APSIPA Annual Summit and Conference, 2011, 5 pages total.

Chen et al., "Algorithm Description of Joint Exploration Test Model 3," Joint Video Exploration Team (JVET) of ITU-T SG 16 WP 3 and ISO/IEC JTC 1/SC 29/WG 11, JVET-C1001_v3, May 26-Jun. 1, 2016, pp. 1-34 (37 pages total).

Jin et al., "Combined Inter-Intra Prediction for High Definition Video Coding," Picture Coding Symposium (PCS 2007), 2007, 5 pages total.

Said et al., "Position Dependent Prediction Combination for Intra-Frame Video Coding," 2016 IEEE International Conference on Image Processing (ICIP), May 29, 2025, 6 pages total.

U.S. Office Action for U.S. Appl. No. 19/028,370, dated Mar. 10, 2026.

Xu et al., "Multiple line-based intra prediction," Joint Video Exploration Team (JVET) of ITU-T SG 16 WP 3 and ISO/IEC JTC 1/SC 29/WG 11, JVET-C0071, May 26-Jun. 1, 2016, pp. 1-6 (7 pages total).

"High Efficiency Video Coding," International Telecommunication Union, ITU-T H.265, URL: https://www.itu.int/rec/T-RECH.265-201304-S/e, Apr. 2013, 317 pages total.

Chen et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting: Hobart, AU, JVET-F1001-v3, Mar. 31-Apr. 7, 2017, 48 pages total.

Chen et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting: Hobart, AU, JVET-F1001-v2, Mar. 31-Apr. 7, 2017, 49 pages total.

Chinese Office Action and Search Report for Chinese Application No. 202311494604.1, dated Jun. 5, 2026, with English translation of the Office Action.

(56) References Cited

OTHER PUBLICATIONS

Chinese Office Action and Search Report for Chinese Application No. 202311495373.6, dated May 18, 2026, with English translation of the Office Action.
Chinese Office Action and Search Report for Chinese Application No. 202311498816.7, dated May 13, 2026, with English translation of the Office Action.
Chinese Office Action and Search Report for Chinese Application No. 202311498992.0, dated May 14, 2026, with English translation of the Office Action.
Chinese Office Action and Search Report for Chinese Application No. 202311499399.8, dated May 16, 2026, with English translation of the Office Action.
Chinese Office Action and Search Report for Chinese Application No. 202311499977.8, dated May 15, 2026, with English translation of the Office Action.
Chinese Office Action and Search Report for Chinese Application No. 202311501748.5, dated May 20, 2026, with English translation of the Office Action. .
Chinese Office Action and Search Report for Chinese Application No. 202311501846.9, dated May 10, 2026, with English translation of the Office Action.
Chinese Office Action and Search Report for Chinese Application No. 202311502776.9, dated Jun. 9, 2026, with English translation of the Office Action.
Chinese Office Action and Search Report for Chinese Application No. 202311506751.6, dated Jun. 1, 2026, with English translation of the Office Action.
Chinese Office Action and Search Report for Chinese Application No. 202311509542.7, dated Jun. 4, 2026, with English translation of the Office Action.
Chinese Office Action and Search Report for Chinese Application No. 202311511532.7, dated May 14, 2026, with English translation of the Office Action.
Egge et al., "Predicting Chroma from Luma with Frequency Domain Intra Prediction," arXiv: 1603.03482v1, Mar. 10, 2016, 10 pages total.
Indian Office Action and Search Report for Indian Application No. 202318045362, dated May 19, 2026, with English translation.
Li et al., "Multiple Line-based Intra Prediction for High Efficiency Video Coding," arXiv:1605.08308v1, May 26, 2016, pp. 1-10.
Li et al., "Multi-Type-Tree," Joint Video Exploration Team (JVET) of ITU-T SG 16 WP 3 and ISO/IEC JTC 1/SC 29/WG 11, 4th Meeting: Chengdu, CN, JVET-D0117r1, Oct. 15-21, 2016, pp. 1-3.
Seregin et al., "Block shape dependent intra mode coding," Joint Video Exploration Team (JVET) of ITU-T SG 16 WP 3 and ISO/IEC JTC 1/SC 29/WG 11, 4th Meeting: Chengdu, CN, JVET-D0114, Oct. 15-21, 2016, pp. 1-3.
Seregin et al., "Neighbor based intra most probable modes list derivation," Joint Video Exploration Team (JVET) of ITU-T SG 16 WP 3 and ISO/IEC JTC 1/SC 29/WG 11, 3rd Meeting: Geneva, CH, JVET-C0055, May 26-Jun. 1, 2016, pp. 1-4.

* cited by examiner (a) first color component block (b) reconstructed first color component block

METHOD AND DEVICE FOR ENCODING/DECODING IMAGE, AND RECORDING MEDIUM IN WHICH BITSTREAM IS STORED

CROSS-REFERENCE TO RELATED APPLICATIONS

This application is a Continuation of U.S. application Ser. No. 18/888,727 filed Sep. 18, 2024, (now U.S. Pat. No. 12,519,934 issued Jan. 6, 2026), which is a Continuation of U.S. application Ser. No. 18/222,566 filed Jul. 17, 2023 (now U.S. Pat. No. 12,143,576 issued Nov. 12, 2024), which is a Continuation of U.S. application Ser. No. 16/628,850, filed Jan. 6, 2020 (now U.S. Pat. No. 11,743,456 issued Aug. 29, 2023), which is a U.S. National Stage Application of International Application No. PCT/KR2018/007016, filed on Jun. 21, 2018, which claims the benefit under 35 USC 119 (a) and 365 (b) of Korean Patent Application No. 10-2017-0086113, filed on Jul. 6, 2017, and Korean Patent Application No. 10-2017-0171377, filed on Dec. 13, 2017, both in the Korean Intellectual Property Office, the entire contents of all these applications being expressly incorporated by reference into the present application.

BACKGROUND

Technical Field

The present invention relates to a method and apparatus for encoding/decoding an image and a recording medium storing a bitstream. Particularly, the present invention relates to a method and apparatus for encoding/decoding an image using intra prediction and a recording medium storing a bitstream generated by an image encoding method/apparatus of the present invention.

Discussion of the Background Art

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

SUMMARY OF THE DISCLOSURE

An object of the present invention is to provide a method and apparatus for encoding and decoding an image to enhance compression efficiency.

Another object of the present invention is to provide a method and apparatus for encoding and decoding an image using intra prediction to enhance compression efficiency.

Another object of the present invention is to provide a recording medium storing a bitstream generated by an image encoding method/apparatus of the present invention.

According to the present invention, an image decoding method comprising configuring a plurality of reference sample lines, reconstructing an intra prediction mode of a current block, and performing intra prediction for the current block based on the intra prediction mode and the plurality of reference sample lines may be provided.

In the image decoding method according to the present invention, the configuring the plurality of reference sample lines may perform padding on a reference sample located at a predetermined position without determining availability of the reference sample.

In the image decoding method according to the present invention, when a length of a horizontal side and a length of a vertical side of the current block are W and H, respectively, an x coordinate or a y coordinate of the predetermined position may be equal to greater than W+H.

In the image decoding method according to the present invention, the padding may be performed using a reference sample adjacent to the predetermined position, the reference sample being located at a position having an x coordinate or a y coordinate being W+H−1.

In the image decoding method according to the present invention, the configuring the plurality of reference sample lines may comprise performing filtering on each of the plurality of reference sample lines.

In the image decoding method according to the present invention, at least one of whether to apply the filtering and a filter type may be adaptively determined based on at least one of an intra prediction mode, a size, a shape of the current block and a target reference sample line.

In the image decoding method according to the present invention, a number of the plurality of reference sample lines may be adaptively determined based on an intra prediction mode of the current block.

In the image decoding method according to the present invention, a number of the plurality of reference sample lines may be adaptively determined based on whether a left boundary or a top boundary of the current block corresponds to a boundary of a predetermined image region.

In the image decoding method according to the present invention, a single reference sample line may be used for samples in a left side of the current block when the left boundary of the current block is the boundary of the predetermined image region, and a single reference sample line may be used for samples in an upper side of the current block when the top boundary of the current block is the boundary of the predetermined image region.

In the image decoding method according to the present invention, the predetermined image region may be at least one of a picture, a tile, a slice, and a coding tree block (CTB).

Further, according to the present invention, an image encoding method comprising determining an intra prediction mode of a current block, configuring a plurality of reference sample lines, and performing intra prediction for the current block based on the intra prediction mode and the plurality of reference sample lines may be provided.

In the image encoding method according to the present invention, the configuring the plurality of reference sample lines may perform padding on a reference sample located at a predetermined position without determining availability of the reference sample.

In the image encoding method according to the present invention, when a length of a horizontal side and a length of a vertical side of the current block are W and H, respectively, an x coordinate or a y coordinate of the predetermined position may be equal to greater than W+H.

In the image encoding method according to the present invention, the padding may be performed using a reference sample adjacent to the predetermined position, the reference sample being located at a position having an x coordinate or a y coordinate being W+H−1.

In the image encoding method according to the present invention, the configuring the plurality of reference sample lines may comprise performing filtering on each of the plurality of reference sample lines.

In the image encoding method according to the present invention, at least one of whether to apply the filtering and a filter type may be adaptively determined based on at least one of an intra prediction mode, a size, a shape of the current block and a target reference sample line.

In the image encoding method according to the present invention, a number of the plurality of reference sample lines may be adaptively determined based on an intra prediction mode of the current block.

In the image encoding method according to the present invention, a number of the plurality of reference sample lines may be adaptively determined based on whether a left boundary or a top boundary of the current block corresponds to a boundary of a predetermined image region.

In the image encoding method according to the present invention, a single reference sample line may be used for samples in a left side of the current block when the left boundary of the current block is the boundary of the predetermined image region, and a single reference sample line may be used for samples in an upper side of the current block when the top boundary of the current block is the boundary of the predetermined image region.

Further, a recording medium according to the present invention may store a bitstream generated by an image encoding method according to the present invention.

According to the present invention, a method and apparatus for encoding and decoding an image to enhance compression efficiency may be provided.

According to the present invention, a method and apparatus for encoding and decoding an image using intra prediction to enhance compression efficiency may be provided.

According to the present invention, a recording medium storing a bitstream generated by an image encoding method/apparatus of the present invention may be provided.

DETAILED DESCRIPTION OF THE EMBODIMENTS

Figure 1:
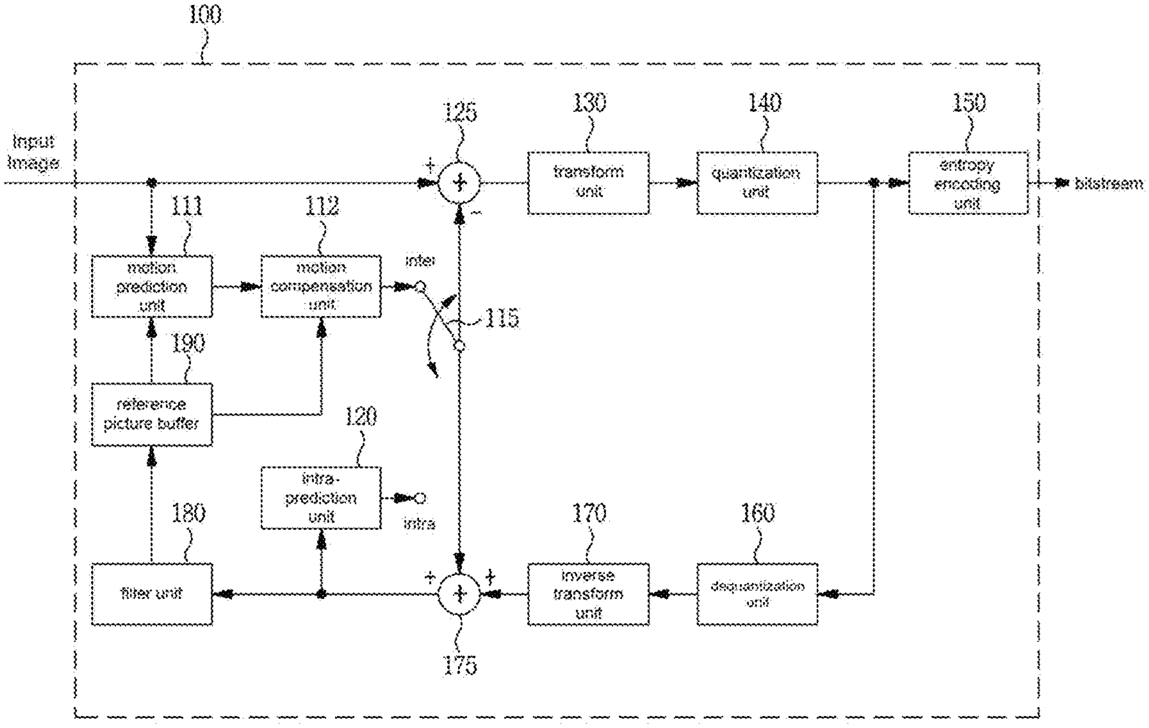
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, ‘first’, ‘second’, etc. can be used to describe various components, but the components are not to be construed as being limited to the terms. The terms are only used to differentiate one component from other components. For example, the ‘first’ component may be named the ‘second’ component without departing from the scope of the present invention, and the ‘second’ component may also be similarly named the ‘first’ component. The term ‘and/or’ includes a combination of a plurality of items or any one of a plurality of terms.

It will be understood that when an element is simply referred to as being ‘connected to’ or ‘coupled to’ another element without being ‘directly connected to’ or ‘directly coupled to’ another element in the present description, it may be ‘directly connected to’ or ‘directly coupled to’ another element or be connected to or coupled to another element, having the other element intervening therebetween. In contrast, it should be understood that when an element is referred to as being “directly coupled” or “directly connected” to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as “including”, “having”, etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being “included”, elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, “encoding or decoding or both of an image” may mean “encoding or decoding or both of a moving picture”, and may mean “encoding or decoding or both of one image among images of a moving picture.”

Hereinafter, terms “moving picture” and “video” may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms “image”, “picture, “frame” and “screen” may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms “target block” and “current block” may be used as the same meaning and be replaced with each other.

Hereinafter, terms “block” and “unit” may be used as the same meaning and be replaced with each other. Or a “block” may represent a specific unit.

Hereinafter, terms “region” and “segment” may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to “0” may represent a logical false or the first predefined value. In other words, a value “0”, a false, a logical false and the first predefined value may be replaced with each other. A value of information, data, flag, index, element and attribute equal to “1” may represent a logical true or the second predefined value. In other words, a value “1”, a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quaternary-tree.

When the size of a coding block falls within a first predetermined range, only quad-tree partitioning is allowed for the coding block. Here, the first predetermined range may be defined by at least one of a maximum size and a minimum size of a coding block that can be partitioned only by quad-tree partitioning. Information indicating the maximum/minimum size of the coding block for which quad-tree partitioning is allowed may be signaled as data included in a bitstream, and the information may be signaled in units of at least one of a sequence, a picture parameter, and a slice (segment). Alternatively, the maximum/minimum size of the coding block may be a fixed size preset in the encoder/decoder. For example, when the size of the coding block is within a range from 64×64 to 256×256, the coding block can be partitioned only by quad-tree partitioning. Alternatively, when the size of the coding block is larger than the maximum size of a transform block (TB), the coding block can be partitioned only by quad-tree partitioning. In this case, the block to be partitioned into quadrants may be either a coding block or a transform block. In this case, information (for example, split_flag) indicating the quad-tree partitioning of a coding block may be a flag indicating whether or not the coding unit is partitioned by quad-tree partitioning. When the size of a coding block falls within a second predetermined range, the coding block can be partitioned only by binary-tree partitioning or ternary-tree partitioning. In this case, the above description of quad-tree partitioning can also be applied to binary-tree partitioning or ternary-tree partitioning.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstructor decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
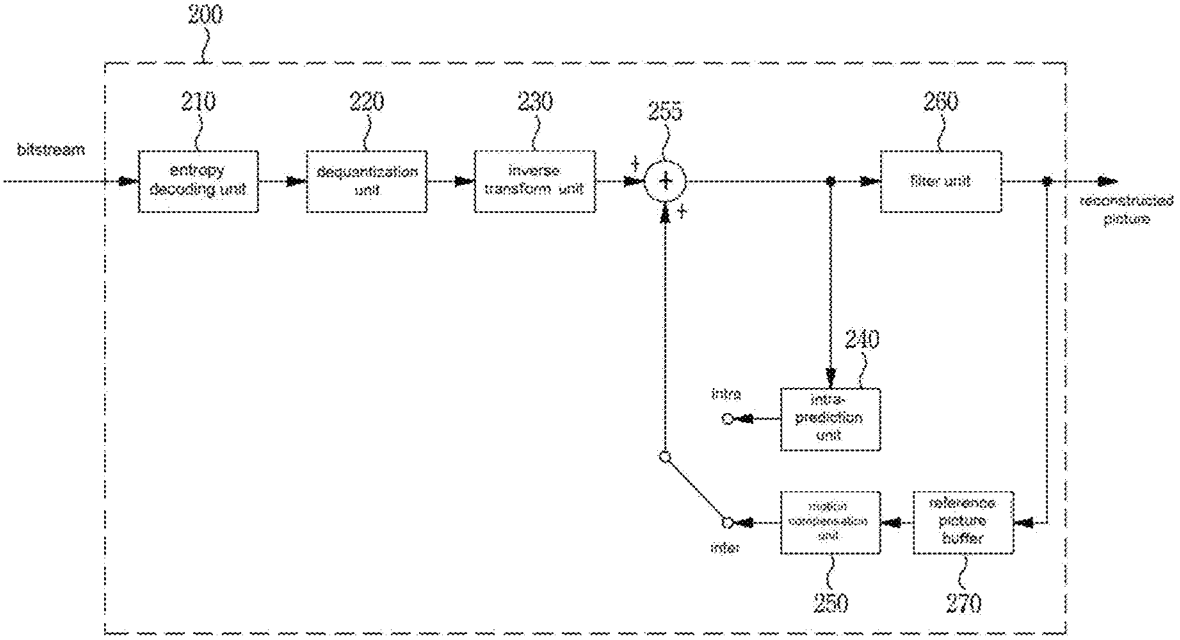
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
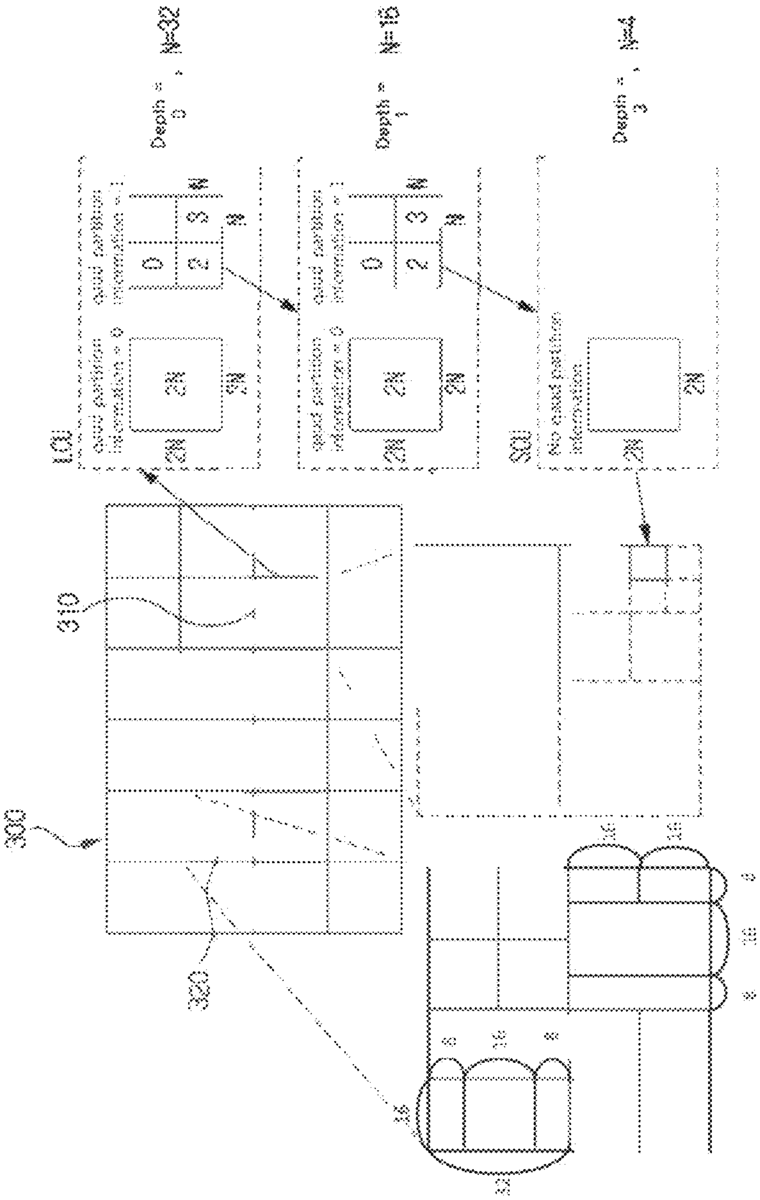
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned(quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned(binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., “1”) may indicate that a current coding unit is partitioned by the quad tree partition structure. The quad partition information having a second value (e.g., “0”) may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., “1”) may indicate that a current coding unit is to undergo a multi-type tree partitioning. The multi-type tree partition indication information having a second value (e.g., “0”) may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., “1”) may indicate that a current coding unit is to be vertically partitioned. The partition direction information having a second value (e.g., “0”) may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., “1”) may indicate that a current coding unit is to be partitioned by a binary tree partition structure. The partition tree information having a second value (e.g., “0”) may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
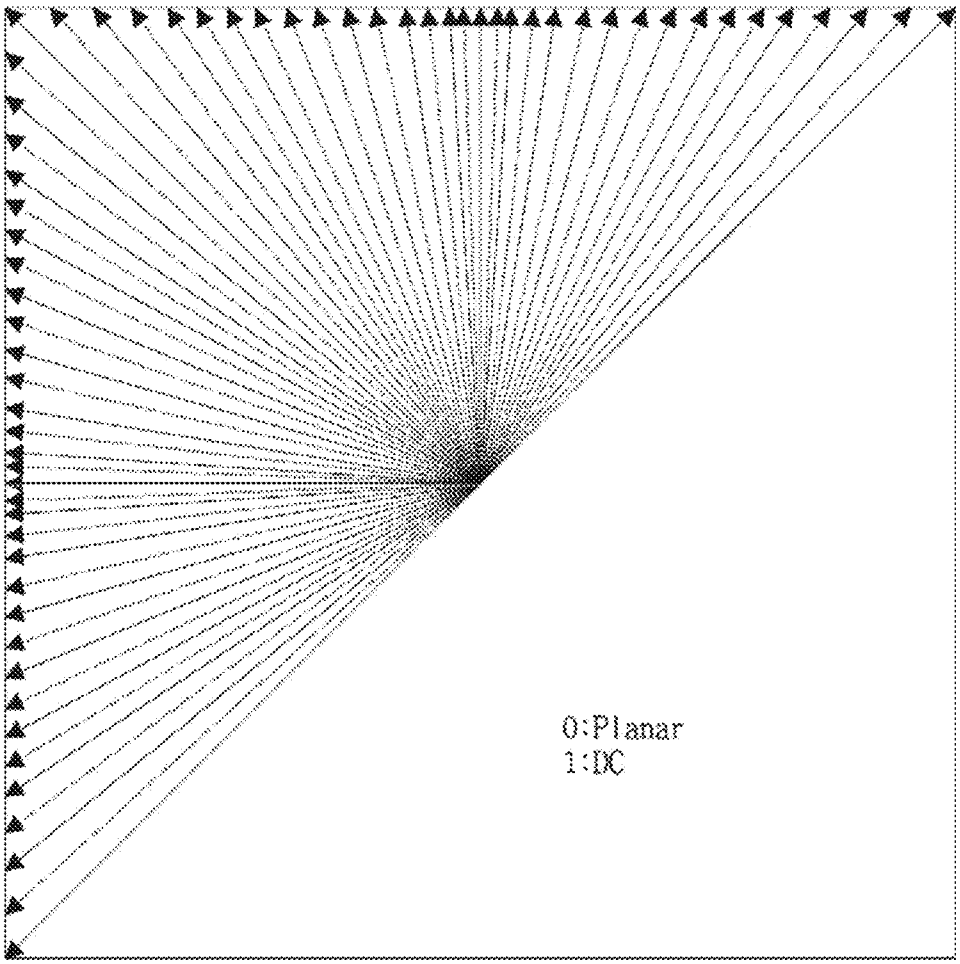
FIG. 4 is a view for explaining an embodiment of a process of intra prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, 67 or 131 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
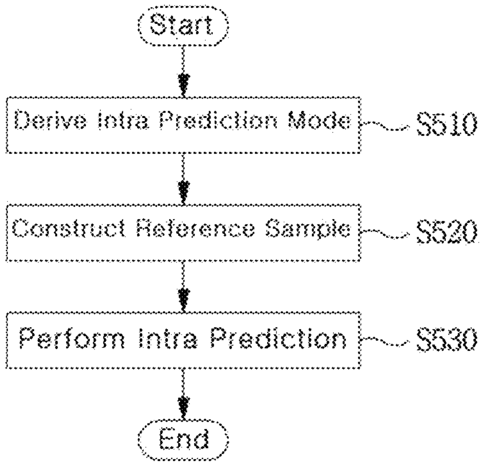
FIG. 5 is a view for explaining intra prediction according to the present invention.

FIG. 5 is a view showing intra-prediction according to the present invention.

Intra-prediction of a current block may include: step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream, a method of using a coding parameter of a neighbor block or a method of using intra prediction mode of a color component. According to the method of using the intra-prediction mode of the neighbor block, the intra-prediction mode of the current block may be derived by using at least one intra-prediction mode derived by using an intra-prediction mode of a neighbor block, a combination of at least one intra-prediction mode of a neighbor block, and at least one MPM.

In step S520, a reference sample may be configured by performing at least one of reference sample selecting, reference sample padding and reference sample filtering.

In step S530, intra-prediction may be performed by performing at least one of non-angular prediction, angular prediction, positional information based prediction, and inter color component prediction. When angular prediction is performed, prediction having angles or interpolation filter types different by a predetermined unit that includes at least one sample of the current block may be performed. The predetermined unit may be, for example, at least one of a singular sample, a sample group, a line, and a block. In step S530, filtering on a prediction sample may be additionally performed. The filter type may mean at least one among a filter tab, a filter coefficient and a filter shape.

An intra prediction may be performed adaptively based on at least one among an intra prediction mode, a size of the current block, a form of the current block and a location of a prediction sample. For example, whether to use a plurality of reference sample lines, whether to perform interpolation filtering, a coefficient of an interpolation filter, whether to perform filtering, whether to perform weighted averaging and/or a weight used for weighted averaging may be adaptively determined based on at least one among an intra prediction mode, a size of the current block, a form of the current block and a location of a prediction sample. The specification for the above will be explained later.

In order to derive the intra-prediction mode of the current block, at least one reconstructed neighbor block may be used. A position of the reconstructed neighbor block may be a fixed position that is predefined, or may be a position derived by encoding/decoding. Hereinafter, encoding/decoding may mean entropy encoding and decoding. For example, when a coordinate of a left upper corner side sample of a current block having a W×H size is (0, 0), a neighbor block may be at least one of blocks adjacent to coordinate of (−1, H−1), (W−1, −1), (W, −1), (−1, H), and (−1, −1), and neighbor blocks of the above blocks. Here, W and H may represent length or the number of samples of width(W) and height(H) of the current block.

An intra-prediction mode of a neighbor block which is not available may be replaced with a predetermined intra-prediction mode. The predetermined intra-prediction mode may be, for example, a DC mode, a planar mode, a vertical mode, a horizontal mode, and/or a diagonal mode. For example, when a neighbor block is positioned outside of a boundary of at least one predetermined unit of a picture, a slice, a tile, and a coding tree unit, the neighbor block is inter-predicted, or when the neighbor block is encoded in a PCM mode, the corresponding block may be determined as non-available. Alternatively, when the neighbor block is unavailable, the intra prediction mode of the corresponding block is not replaced and not used.

The intra-prediction mode of the current block may be derived as a statistical value of an intra-prediction mode of a predetermined positional neighbor block or an intra-prediction mode of at least two neighbor blocks. In the present description, the statistical value may mean at least one of an average value, a maximum value, a minimum value, a mode, a median value, a weighted average value, and an interpolation value.

Alternatively, the intra-prediction mode of the current block may be derived based on a size of neighbor blocks. For example, an intra-prediction mode of a neighbor block having relatively large size may be derived as the intra-prediction mode of the current block. Alternatively, a statistical value may be calculated by assigning a large weight on an intra-prediction mode of a block having relatively large size. Alternatively, a mode to which a relatively large weight is assigned may be pre-defined or signaled. For example, a relatively large weight may be assigned to at least one among a vertical directional mode, a horizontal directional mode, a diagonal directional mode and non-directional mode. The same weight may be assigned to the above modes.

Alternatively, whether or not the intra-prediction mode of the neighbor block is angular mode may be considered. For example, when the intra-prediction mode of the neighbor block is a non-angular mode, the non-angular mode may be derived as the intra-prediction mode of the current block. Alternatively, an intra-prediction mode of other neighbor block, except for the non-angular mode, may be derived as the intra-prediction mode of the current block.

In order to derive the intra-prediction mode of the current block, one or more most probable mode (MPM) lists may be configured by using an intra-prediction mode of a neighbor block. A number N of candidate modes included in an MPM list may be fixed, or may be determined according to a size or form or both of the current block. The MPM list may be configured not to include an overlapped mode. When a number of available candidate modes is smaller than N, a predetermined candidate mode among available candidate modes, for example, a mode obtained by adding or subtracting a predetermined offset to an angular mode may be added to the one or more MPM lists. Alternatively, at least one of a horizontal mode, a vertical mode, a 45 angular mode, a 135 angular mode, a 225 angular mode, and a non-angular mode may be added to the MPM list. The predetermined offset may be 1, 2, 3, 4, or a positive integer.

The MPM list may be configured in a predetermined sequence based on a position of the neighbor block. For example, the predetermined sequence may be a sequence of blocks adjacent to a left side, an upper side, a left lower corner side, a right upper corner side, and a left upper corner side of the current block. A non-angular mode may be included in the MPM list at an arbitrary position. For example, it may be added next to intra-prediction modes of blocks adjacent to a left side and an upper side.

An MPM list generated based on the current block may be used as an MPM list for at least one sub block included in the current block. An order between candidate modes configuring an MPM list, the number of candidate modes included in an MPM list, etc., may be determined based on a size, a form and/or a component of the current block.

Alternatively, a group of modes may be configured by selecting a part of modes among modes which are not included in an MPM list. The configured group of modes may be utilized as another list. For example, a group of modes may be configured using modes which are obtained by sampling with a predetermined interval after arranging modes which are not MPM candidates, or using modes which are obtained by adding/subtracting n (n is an integer equal to or larger than 1) to/from a MPM candidate mode.

As another embodiment, the intra-prediction mode of the current block may be derived by using an intra-prediction mode derived by using an MPM list and an intra-prediction mode of a neighbor block. For example, when the intra-prediction mode derived by using the MPM list is Pred_mpm, the Pred_mpm may be changed by using the intra-prediction mode of the neighbor block. For example, when Pred_mpm is larger than the intra-prediction mode of the neighbor block (or larger than a statistical value of at least two intra-prediction modes), Pred_mpm may be increased by n, otherwise, Pred_mpm may be decreased by n. Herein, n may be a predetermined integer such as +1, +2, +3, 0, −1, −2, −3, etc. The intra-prediction mode of the current block may be derived as the changed Pred_mpm. Alternatively, when at least one of Pred_mpm and intra-prediction modes of the neighbor block is a non-angular mode, the intra-prediction mode of the current block may be derived as the non-angular mode. Alternatively, the intra-prediction mode of the current block may be derived as an angular mode.

According to a further embodiment of the present invention relating to a method of deriving an intra prediction mode, an intra prediction mode of a current block may be derived by using an intra prediction mode of a different color component. For example, when the current block is a chroma block, an intra prediction mode of a luma block corresponding to the chroma block can be used to derive an intra prediction mode of the chroma block. As the luma block corresponding to the chroma block, there may be one or more luma blocks. The corresponding luma block may be determined depending on at least any one of the size, the shape, and the encoding parameter of a chroma block. Alternatively, the corresponding luma block may be determined depending on at least any one of the size, the shape, and the encoding parameter of a luma block.

The luma block corresponding to the chroma block may be composed of a plurality of partitions. All or part of the plurality of partitions may have different intra prediction modes thereof. An intra prediction mode of the chroma block may be derived on the basis of all or part of the plurality of partitions included in the corresponding luma block. In this case, some partitions may be selectively used, in which the used partitions are selected based on the comparison of the block size, the shape, the depth information, etc. of the chroma block with those of the luma block (all or part of the plurality of partitions). A partition at a position in the luma block corresponding to a predetermined position in the chroma block may be selectively used. The predetermined position may refer to a corner sample (e.g., upper left sample) position in the chroma block or a center sample position in the chroma block.

The method of deriving an intra prediction mode of one color component block using an intra prediction mode of a different color component block (i.e. inter color component intra prediction mode) according to the present invention is not limited to the example in which an intra prediction mode of a luma block corresponding to a chroma block is used. For example, an intra prediction mode of a chroma block may be derived by using or sharing at least any one of an MPM index mpm_idx and an MPM list of a luma block corresponding to the chroma block.

Figure 6:
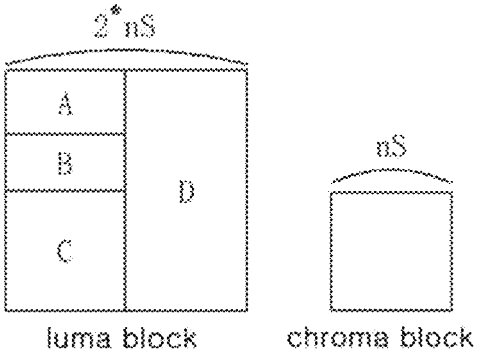
FIG. 6 is an exemplary diagram illustrating the relationship between a luma block and a chroma block.

FIG. 6 is an exemplary diagram illustrating the relationship between a luma block and a chroma block.

In the example illustrated in FIG. 6, a sample ratio of color components is 4:2:0, and at least one of luma blocks A, B, C, and D corresponds to one chroma block.

With reference to FIG. 6, an intra prediction mode of one chroma block may be derived by using an intra prediction mode of the luma block A corresponding to a sample at an upper left position (0,0) in the chroma block or an intra prediction mode of the luma block D corresponding to a sample at a center position (nS/2, nS/2) in the chroma block. The predetermined position in the chroma block is not limited to the upper left position (0, 0) or the center position (nS/2, nS/2). For example, The predetermined position may be an upper right position, a lower left position, and/or a lower right position.

The predetermined position may be selected on the basis of the shape of the chroma block. For example, with the chroma block having a square shape, the predetermined position may be a center sample position. With the chroma block having an oblong shape, the predetermined position may be an upper left sample position. Alternatively, the predetermined position may be a position of an upper left sample in the chroma block having a square shape or a position of a center sample in the chroma block having an oblong shape.

According to a further embodiment, an intra prediction mode of a chroma block may be derived by using statistic figures of one or more intra prediction modes of a luma block having an equal size to the chroma block.

In the example illustrated in FIG. 6, a mode corresponding to the average of the intra prediction modes of the luma blocks A and D or a mode corresponding to the average of the intra prediction modes of the blocks A, B, C, and D inside the luma block corresponding to a size of the chroma block is derived as the intra prediction mode of the chroma block.

When there are multiple intra prediction modes of available luma blocks, all or part of them may be selected. The selection is performed based on the predetermined position in the chroma block or based on the size(s), the shape(s), and/or the depth(s) of the chroma block, the luma block, or both. The intra prediction mode of the chroma block can be derived by using the selected intra prediction mode of the luma block.

For example, the size of the luma block A corresponding to the upper left sample position (0,0) in the chroma block and the size of the luminance bock D corresponding to the center sample position (nS/2, nS/2) in the chroma block are compared, and the intra prediction mode of the luma block D having a larger size may be used to derive the intra prediction mode of the chroma block.

Alternatively, when the size of a luma block corresponding to a predetermined position in a chroma block is equal to or larger than the size of the chroma block, an intra prediction mode of the chroma block is derived by using the intra prediction mode of the luma block.

Alternatively, when the size of a chroma block is within a predetermined range, an intra prediction mode of the chroma block is derived by using an intra prediction mode of a luma block corresponding to the upper left sample position (0, 0) in the chroma block.

Alternatively, when the size of a chroma block is within a predetermined range, the size of a luma block corresponding to a predetermined position (0, 0) of the chroma block and the size of a luma block disposed at another predetermined position (nS/2, nS/2) of the chroma block are compared, and an intra prediction mode of the chroma block is derived by using the intra prediction mode of the luma block having a larger size.

The predetermined range may be derived from at least any one piece of information among information signaled through a bitstream, information of the size (and/or depth) of a block (a chroma block, a luma block, or both), and information predefined in an encoder or a decoder.

Alternatively, when a chroma block has an oblong shape, an intra prediction mode of the chroma block may be derived by using an intra prediction mode of a luma block corresponding to a center sample position (nS/2, nS/2) in the chroma block.

Among the plurality of partitions of the luma block, a partition having the same shape as the chroma block may be used. For example, when the chroma block has a square shape or a non-square shape, a partition having a square shape or a non-square shape, selected among the plurality of partitions of the luma block, may be used.

In the example described with reference to FIG. 6, the method of deriving an intra prediction mode of a chroma block using an intra prediction mode of a luma block also applies to a case in which an intra prediction mode of a luma block is used as an intra prediction mode of a chroma block as it is. The method of deriving an intra prediction mode of a chroma block is not limited to the method of using an intra prediction mode of the corresponding luma block. For example, an intra prediction mode of a chroma block can be derived from information, including an MPM list and an MPM index mpm_idx, which is used to derive an intra prediction mode of a luma block.

Alternatively, the MPM list of the chroma block can be constructed using the intra prediction mode of the luma block corresponding to the sample of the predetermined position in the chroma block. In this case, the mpm-idx information of the chroma block may be encoded and signaled. The MPM list of the chroma block may be constructed in a similar way to the construction of the MPM list of the luma block. MPM candidates of the chroma block may include intra prediction modes of neighbor chroma blocks and/or intra prediction modes of luma blocks corresponding to the chroma block.

When an MPM flag is 0, a second MPM list including at least one intra-prediction mode may be configured, and the intra-prediction mode of the current block may be derived by using a second MPM index (2nd_mpm_idx). Herein, a second indicator (for example, a second MPM flag) indicating whether or not the intra-prediction mode of the current block is included in the second MPM list may be encoded/decoded. Similar to a first MPM list, the second MPM list may be configured by using intra-prediction modes of the neighbor block. Herein, the intra-prediction mode included in the first MPM list may not be included in the second MPM list. A number of MPM lists is not limited to 1 or 2, N MPM lists may be used.

When the intra-prediction mode of the current block is not included in one of a plurality of MPM lists, a luma component intra-prediction mode of the current block may be encoded/decoded. In addition, a chroma component intra-prediction mode may be derived and encoded/decoded based on an associated luma component intra-prediction mode.

When the current block is partitioned into a plurality of sub-blocks, in order to derive an intra-prediction mode of each sub-block, at least one of the described methods may be applied.

A size or form or both of a sub-block may be a predetermined size or block or both (for example, 4×4), or may be determined according to a size or form or both of the current block. Alternatively, the size of the sub-block may be determined based on whether or not a neighbor block of the current block is partitioned, or may be determined based on an intra-prediction mode of a neighbor block of the current block. For example, the current block may be partitioned based on a boundary at which an intra-prediction mode of a neighbor block is different. Alternatively, the current block may be partitioned based on whether the neighbor block is an intra coding block or an inter coding block.

An indicator (for example, NDIP_flag) representing that the intra-prediction mode of the current block is derived by using the intra-prediction mode of the neighbor block may be encoded/decoded. The indicator may be encoded/decoded by at least one unit of the current block and the sub-block. Herein, when a size of the current block or the sub-block corresponds to a predetermined size or a predetermined size range, the indicator may be encoded/decoded.

Determining whether or not the size of the current block corresponds to a predetermined size may be performed based on a horizontal or vertical length of the current block. For example, when the horizontal or vertical length is a length capable of being partitioned, it is determined that the size of the current block corresponds to a predetermined size.

When the current block is partitioned into a plurality of sub-blocks, an intra-prediction mode of the plurality of sub-blocks may be derived in a zig-zag sequence, or may be derived in parallel. An intra-prediction mode of the sub-block may be derived by at least one of methods of deriving the intra-prediction mode of the current block. Herein, the neighbor block of the current block may be used as a neighbor block of each sub-block. Alternatively, the sub-block within the current block may be used as a neighbor block of each sub-block.

An intra-prediction mode for the first sub-block among sub-blocks inside the current block may be derived with a different method from other sub-blocks. The first sub-block, for example, may be the first sub-block in a scan order.

An intra-prediction mode of a sub-block included in a current block may be derived by using an average value of an intra-prediction mode of the current block and an intra-prediction mode of a block adjacent to a left and upper side of a sample positioned at (0, 0) of each sub-block. For example, when an intra-prediction mode of a current block is larger than the above average value, the half of the above average value may be subtracted from the derived intra-prediction mode. When the intra-prediction mode of the current block is equal to or less than the above average value, the half of the above average value may be added to the derived intra-prediction mode.

Intra-prediction information may be signaled through at least one of a video parameter set (VPS), a sequence parameter set (SPS), a picture parameter set (PPS), an adaptation parameter set (APS), a slice header, and a tile header. In a predetermined block size or less, at least one piece of intra-prediction information may not be signaled. Herein, intra-prediction information of a previously encoded/decoded block (for example, higher block) may be used.

A reference sample for intra-prediction may be configured based on the derived intra-prediction mode. In the description hereinafter, a current block may mean a prediction block or a sub-block having a size/form smaller than a size/form of the prediction block. The reference sample may be configured by using at least one sample reconstructed adjacent to a current block or by using a combination of samples. In addition, filtering may be applied to the configured reference sample.

A number or position or both of reconstructed sample lines used for configuring the reference sample may vary according to a position of a current block within a coding tree block. Each reconstructed sample on a plurality of reconstructed sample lines may be used as a reference sample at it is. Alternatively, a predetermined filter may be applied to the reconstructed sample, and a reference sample may be generated by using the filtered reconstructed sample. Reconstructed samples to which a filter is applied may be included in the same reconstructed sample line or in different reconstructed sample lines.

The configured reference sample may be represented as ref[m, n], and a sample obtained by applying a filter to the configured reference sample may be represented as rec[m, n]. Herein, m or n may be a predetermined integer value representing a position of a sample. When a position of a left upper side sample within the current block is (0, 0), a position of a left upper side reference sample of the current block may be set to (−1, −1).

Figure 7:
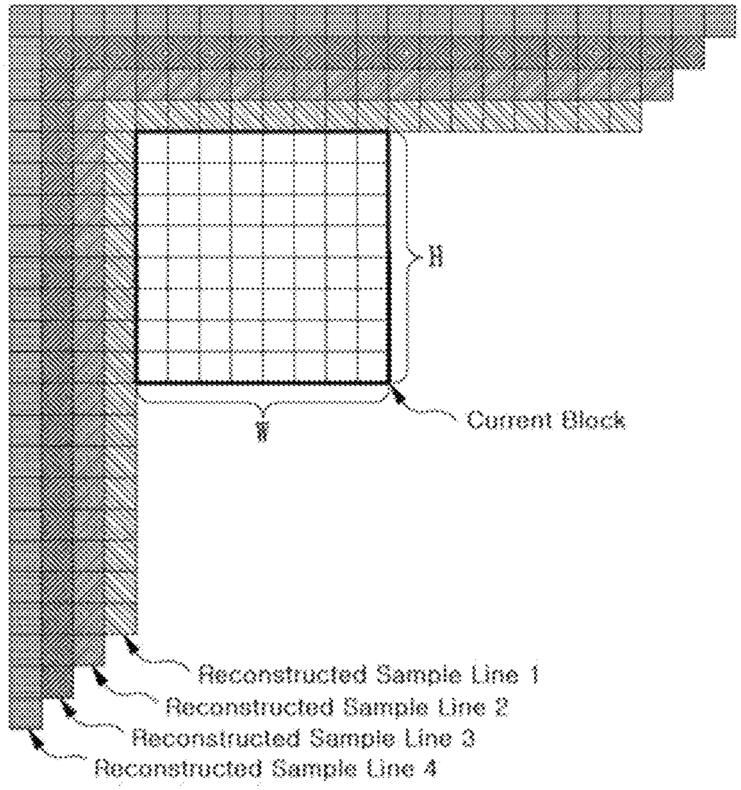
FIG. 7 is a diagram for describing a plurality of reconstructed sample lines.

FIG. 7 is a diagram for describing a plurality of reconstructed sample lines.

A reference sample can be constructed by selecting one or more reconstructed sample lines adjacent to the current block. For example, in FIG. 7, one of the plurality of reconstructed sample lines may be selected so as to construct a reference sample.

For example, a particular reconstructed sample line of the plurality of reconstructed sample lines may be fixedly or adaptively selected, or an arbitrary reconstructed sample line may be adaptively selected, in order to construct a reference sample.

In another embodiment, to construct a reference sample, one or more reconstructed sample lines may be selected from the plurality of reconstructed sample lines illustrated in FIG. 7, and the selected reconstructed sample lines may be combined.

For example, as shown in Equation 1, a reference sample may be constructed using a weighted average of reconstructed samples, in which the weights of the reconstructed samples differ according to the distance between the reconstructed sample and the current block.

$$ref[-1,-1] = (rec[-2,-1] + 2Xrec[-1,-1] + rec[-1,-2] + 2) \gg 2 \quad \text{[Equation 1]}$$

$$ref[x,-1] = (rec[x,-2] + 3Xrec[x,-1] + 2) \gg 2,\ (x = 0 \text{ to } H + W - 1)$$

$$ref[-1,y] = (rec[-2,y] + 3Xrec[-1,y] + 2) \gg 2,\ (y = 0 \text{ to } H + W - 1)$$

Alternatively, a reference sample may be constructed using at least one of a mean value, a maximum value, a minimum value, a median value, and a mode value of a plurality of reconstructed samples based on at least one of the distance from the current block to the corresponding reconstructed sample and the intra prediction mode of the current block.

Alternatively, a reference sample may be constructed based on a change (change amount) between each of the sample values of the successive reconstructed samples. For example, a reference sample may be constructed based on at least one of a determination of whether the values of two successive reconstructed samples differ by more than a threshold value and a determination of whether the values of successive reconstructed samples change continuously or discontinuously. For example, when the values of a rec[−1, −1] and a rec[−2, −1] differ by more than a threshold value, the value of the ref[−1, −1] is determined as having the value of the rec[−1, −1], or a value corresponding to a weighted average obtained by applying a predetermined weight to the value of the rec[−1, −1]. For example, each of the values of the successive reconstructed samples changes by n as the distance between the reconstructed sample and the current block decreases, and thus the value of ref[−1, −1] is represented as "ref[−1, −1]=rec[−1, −1]−n".

In a different embodiment, referring to FIG. 7, two or more reconstructed sample lines may be selected to construct a reference sample. For example, two lines including a reconstructed sample line 1 and a reconstructed sample line 2 may be fixedly selected, or four lines ranging from a reconstructed sample line 1 to a reconstructed sample line 4 may be selected to construct a reference sample.

Alternatively, two or more reconstructed sample lines may be adaptively selected to construct a reference sample. For example, one reconstructed sample line may be fixedly selected, and one or more reconstructed sample lines may be adaptively selected among the other reconstructed sample lines to construct a reference sample.

The fixedly selected reconstructed sample line may be predefined in the encoder/decoder. For the case where the fixedly selected reconstructed sample line is predefined, information on the fixedly selected reconstructed sample line may not be signaled.

The information on the adaptively selected reconstructed sample line(s) may be signaled in the form of an indicator or index. The adaptively selected reconstructed sample line may be determined based on at least one of coding parameters of the current block or a block neighboring the current block. For example, the adaptively selected reconstructed sample line may be determined based on at least one of the size/shape and intra prediction mode of the current block or the block neighboring the current block. In this case, the information necessary for selection may not be signaled.

A reference sample line may include one or more samples. For example, the reference sample line may include samples corresponding to a length equal to the width (that is, the horizontal dimension) or height (that is, the vertical dimension) of the current block. As another example, the reference sample line may include samples corresponding to a length that is two times the width or height of the current block. As a further example, the reference sample line may include samples corresponding to a length equal to N samples (N is 1, 2, 3, . . . ) plus two times the sum of the width and height of the current block. That is, the reference sample line may include reference samples corresponding to 2×(W+H)+N (where W and H are the width and height of the current block, and N is an integer of 1 or more).

The method of constructing a reference sample adjacent to an upper part of the current block and the method of constructing a reference sample adjacent to a left part of the current block may differ. For example, the number of reference sample lines located above the current block and the number of reference sample lines located to the left of the current block may differ. For example, the number of reference sample lines adjacent to the upper part of the current block may be one and the number of reference sample lines adjacent to the left part of the current block may be two, according to at least one of the width or height of the current block, and the intra prediction mode of the current block. For example, the length of the reference sample line above the current block and the length of the reference sample line located to the left of the current block may differ. For example, the length of the reference sample line may vary according to at least one of the width or height of the current block and the intra prediction mode of the current block.

Each of the reference sample lines may have a different length. For example, referring to FIG. 7, the lengths of the reconstructed sample lines 2 to 4 may be longer than the reconstructed sample line 1 by a length corresponding to one or more samples.

The length of the reference sample line may be different for each of the reconstructed sample lines. For example, a reconstructed sample line n may be longer or shorter than a reconstructed sample line n−1 by a length corresponding to m samples. In the example illustrated in FIG. 7, the reconstructed sample line n is longer than the reconstructed sample line n−1 by a length corresponding to one sample.

Alternatively, the reference sample lines may be reconstructed by being shifted according to the intra prediction mode of the current block. For example, when there is no reference sample at the position referenced by a certain intra prediction mode, the reference sample line may be shifted so that the reference sample will be available at the position referenced by the intra prediction mode. Which reference sample line is to be shifted, or how far the reference sample line is to be shifted may be determined based on which intra prediction mode is used for the current block, an angle of a prediction direction, and/or the position at which the reference sample line is located.

As described above, decision information on whether to construct a reference sample using only the nearest reference sample line or using a plurality of reference sample lines may be encoded/decoded. For example, the decision information may be encoded/decoded at the level of at least one of a sequence, a picture, a slice, a tile, a CTU, a CU, a PU, and a TU. In addition, information on the availability of each of the plurality of reference sample lines may be signaled at a higher level.

At least one of the number, position, and configuration of the reconstructed sample lines used in the reference sample construction may be differently set when the top boundary or the left boundary of the current block corresponds to the boundary of at least one of a picture, a slice, a tile, and a coding tree block (CTB). For example, when two or more reference sample lines are constructed, when the top boundary of the current block corresponds to the boundary of at least one of a picture, a tile, a slice, and a coding tree block (CTB), one reference sample line adjacent to the upper part of the current block may be constructed. For example, one reference sample line may be configured when the top boundary of the current block corresponds to the top boundary of a CTU, and otherwise, two or more reference sample lines may be configured. In this case, since only one reference sample line at the top boundary of the CTU is used, the size of a line buffer for storing data of the reference samples of the reference sample line can be reduced.

When selecting a reference sample, availability determination and reference sample padding may be performed for a block containing the reference sample to be used. For example, when a block containing a reference sample is available, the corresponding reference sample can be used. On the other hand, when a block containing a reference sample is not available, the unavailable reference samples in the block may be padded with one or more available neighboring reference samples.

When a reference sample is located outside the boundary of at least one of a picture, a tile, a slice, or a coding tree block (CTB), the reference sample may be determined to be unavailable. When the current block is coded with constrained intra prediction (CIP), in the case where the block including the reference sample has been encoded/decoded in an inter prediction mode, the reference sample is determined to be unavailable.

Figure 8:
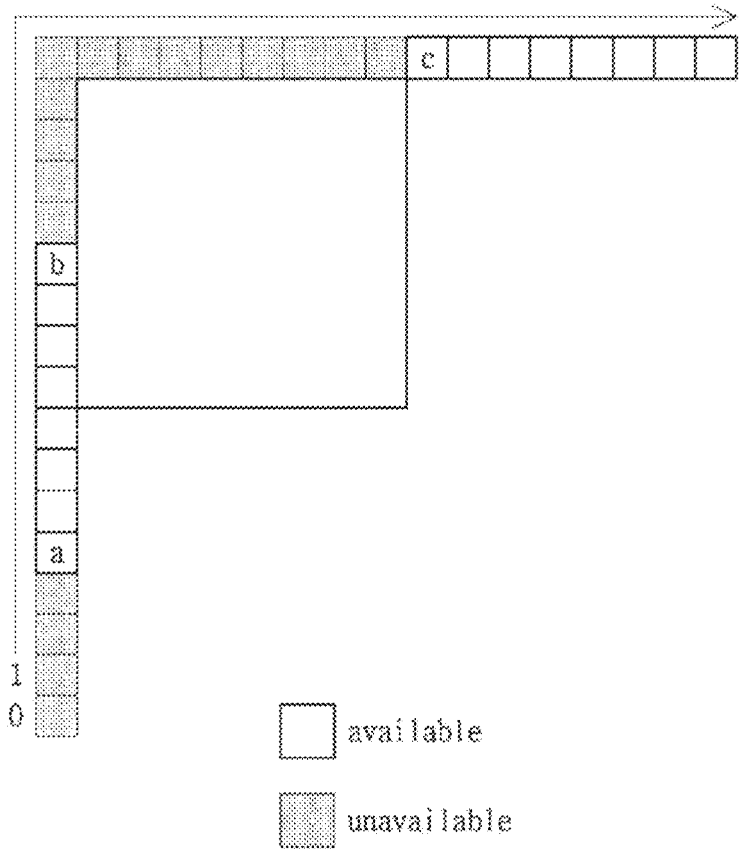
FIG. 8 is a diagram for describing a process of replacing an unavailable sample with an available sample.

FIG. 8 is a diagram for describing a process of replacing an unavailable sample with an available sample.

When it is determined that the reconstructed neighboring sample is not available, the unavailable sample may be replaced with a reconstructed neighboring sample, which is an available sample. For example, when there are both available samples and unavailable samples as illustrated in FIG. 8, one or more available samples can be used to replace one or more unavailable samples.

The sample values of the unavailable samples may be replaced with the values of the available samples in a predetermined order. The available samples used to replace the unavailable samples may be available samples located adjacent to the unavailable samples. When no available sample is adjacent to the unavailable sample, the earliest or closest available sample may be used to replace the unavailable sample. The replacing order of the unavailable samples may be, for example, from the bottom left to the top right. Alternatively, the replacing order may be from the top right to the bottom left. Specifically, the replacing order may be from the top left corner to the top right and/or to the bottom left. Alternatively, the replacing order may be from the top right and/or from the bottom left to the top left corner.

For example, filling the unavailable samples with the values of available samples may start from the position 0, which is the bottom left sample position. That is, the first four unavailable samples may be filled with a value of "a", and the subsequent 13 unavailable samples may be filled with a value of "b".

For example, the unavailable samples may be filled with a combined value of the available samples. For example, the unavailable samples may be filled with an average value or an interpolated value of the available samples respectively adjacent to both ends of a line of the unavailable samples. That is, the first four unavailable samples are filled with the value "a", and the next 13 unavailable samples may be filled with the average of a value of "b" and a value of "c", or may be filled by interpolating the value "b" and the value "c".

Alternatively, the 13 unavailable samples may be filled with an arbitrary intermediate value between the sample values "b" and "c" of the available samples. In this case, the unavailable samples may be filled with different respective values. For example, as the distance of an unavailable sample to the available sample having the value "a" decreases, the unavailable sample will be filled with a value that is closer to the value "a". For example, the closer an unavailable sample is to an available sample having the value "b", the closer the value that fills the unavailable sample is to the value "b". That is, the value of an unavailable sample may be determined based on the distance between the unavailable sample and the available sample having the value "a" or "b". To replace unavailable samples with available samples, one or more replacement methods including the methods described above may be adaptively used. The method of replacing unavailable samples with available samples may be signaled as information contained in a bitstream, or may be predetermined in the encoder/decoder. Alternatively, a replacement method may be derived according to a predetermined determination method. For example, the replacement method may be determined based on the difference between the values "a" and "b" or based on the number of unavailable samples. More specifically, the replacement method may be determined by comparing the difference between the values of two available samples with a threshold value and/or by comparing the number of unavailable samples with a threshold value. For example, when the difference between the values of the two available samples is greater than the threshold value, and/or when the number of unavailable samples is greater than the threshold value, the unavailable samples may be replaced to have different values from each other. The selection of the method of replacing unavailable samples with available samples may be performed on a per-predetermined-unit basis. For example, the replacement may be selected on a per-video basis, a per-sequence basis, a per-picture basis, a per-slice basis, a per-tile basis, a per-coding-tree-unit (CTU) basis, a per-coding-unit (CU) basis, a per-prediction-unit (PU) basis, a per-transform-unit (TU) basis, or a per-block basis. At this time, the selection of the method of replacing unavailable samples with available samples may be determined based on the information signaled on a per-predetermined-unit basis or may be derived on a per-predetermined-unit basis. Alternatively, the selection method for the replacement methods may be predetermined in the encoder/decoder.

When a reference sample is located at a predetermined position, padding may be automatically performed without determining whether a block including the reference sample is available or not. For example, referring to FIG. 7, when the position (x, y) of the top left corner sample of the current block is (0, 0), sample availability may not be determined for samples located at (x, y) in which the x coordinate or the y coordinate is equal to or greater than W+H (x=W+H or greater or y=W+H or greater), and the samples may be padded with neighboring reference samples.

For example, a sample ref[W+H, −2] may be padded with the value of a sample ref[W+H−1, −2] without performing the availability determination on the sample ref[W+H, −2]. As another example, a sample ref[W+H, −3] may be padded with the value of a sample ref[W+H−1, −3] without performing the availability determination on the sample[W+H, −3]. That is, the padding may be performed on the samples located at positions (x, y: x is equal to or greater than W+H or y is equal to or greater than W+H) by using the closest sample on the same sample line without performing the availability determination thereon.

When the position of the top left corner sample of the current block is (0, 0), for samples located at positions (x, y: x is equal to or greater than W and is less than W+H) among the samples located above the current block, the availability determination will be performed, and then the padding will be performed according to the result of the availability determination. For samples located at positions (x, y: y is equal to or greater than H and is less than W+H) among the samples located to the left of the current block, the availability determination will be performed, and the padding will be performed according to the availability determination.

For example, when the position of the top left corner sample of the current block is (0, 0), for samples corresponding to rec[x, −1](x ranges from −1 to W+H−1) and/or samples corresponding to rec[−1, y] (y ranges from 0 to H+W−1), the availability determination and the padding may be performed.

For the padding, a plurality of reference sample lines may be used. For example, when the padding is performed on a first reference sample line adjacent to (that is, the closest to) the current block, a second reference sample line, which is the second closest to the current block, may be used. For example, the padding may be performed according to Equation 2. That is, the sample values of the first reference sample line may be derived by using the weighted average of samples selected from the first reconstructed reference sample line and samples selected from the second reconstructed reference sample line. In this case, the selected reconstructed sample may be one located at a current sample position or at a position adjacent to the current sample position.

$$ref[x,-1]=(rec[x,-2]+3Xrec[x,-1]+2)\gg 2,\quad (x=0\sim H+W-1) \qquad \text{[Equation 2]}$$

Filtering may be performed on one or more reference samples among the samples constructed as above. The filtering may be adaptively performed based on at least one of the intra prediction mode of the current block, the size of the current block, and the shape of the current block. For example, at least one of a determination of whether to apply filtering, a filter type, a filter strength, and a filter coefficient may be adaptively determined.

For example, whether to apply the filtering may be determined for each of the plurality of reference sample lines. For example, the filtering may be applied to the first reference sample line adjacent to the current block, and may not be applied to the second reference sample line. For example, both a filtered value and an unfiltered value may be used for the same reference sample.

For example, at least one of a 3-tap filter, a 5-tap filter, a 7-tap filter, and an N-tap filter may be selectively applied according to at least one of the intra prediction mode of the current block, the size of the current block, and the shape of the current block. In this case, M is an integer equal to or greater than 3.

Figure 9:
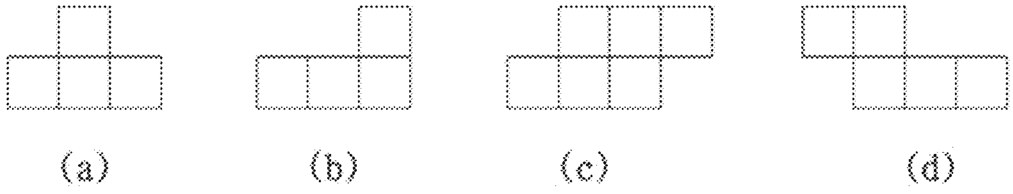
FIG. 9 illustrates various filter shapes.

For example, filters having different shapes may be selectively used according to at least one of the intra prediction mode, the size, and the shape of the current block. FIG. 9 illustrates various filter shapes.

The shape of the current block may be determined by comparing the width (horizontal dimension) of the current block with the height (vertical dimension) of the current block. For example, at least one of a decision of whether to apply a filter, a filter type, a filter strength, and a filter coefficient may be adaptively determined according to whether the current block is a horizontally oblong block or a vertically oblong block. Alternatively, at least one of a decision of whether to apply filtering, a filter type, a filter strength, and a filter coefficient may be adaptively determined according to whether the current block is a rectangular block or a square block.

Intra prediction for the current block may be performed based on the derived intra prediction mode and the constructed reference sample.

For example, non-directional intra prediction may be performed for the current block. The mode of the non-directional intra prediction may be at least one of a DC mode, a planar mode and an LM mode.

For the DC mode, prediction may be performed using the average value of one or more reference samples among the constructed reference samples. In this case, filtering may be applied to one or more prediction samples (also referred to as predicted samples) located at the boundary of the current block. The DC prediction may be adaptively performed based on at least one of the size of the current block and the shape of the current block. Further, the range of the reference samples used in the DC mode can be determined based on at least one of the size and the shape of the current block.

Figure 10:
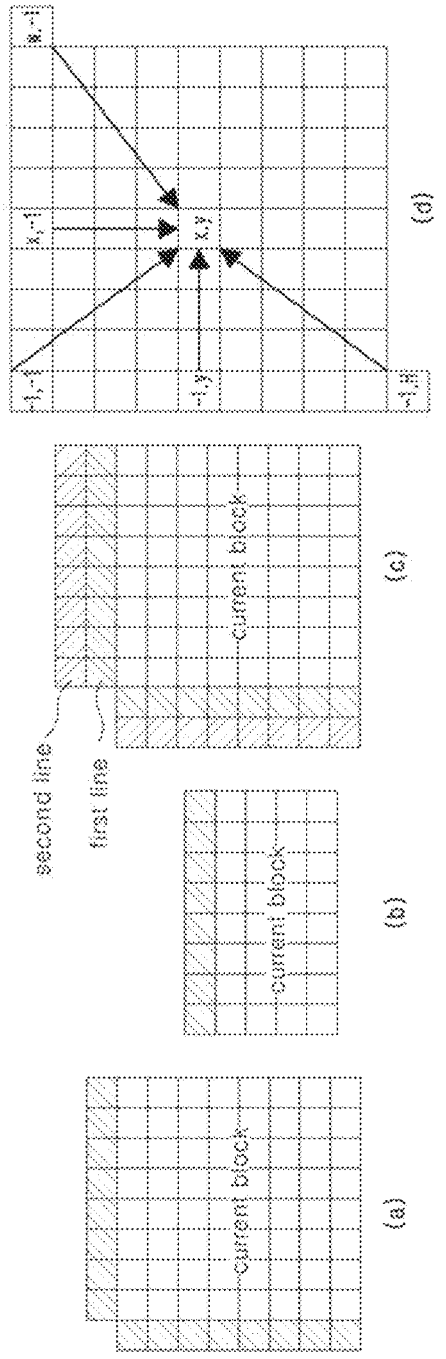
FIG. 10 is a diagram for describing intra prediction according to the shapes of the current block.

FIG. 10 is a diagram for describing intra prediction according to the shapes of the current block.

For example, when the current block is a square block, as illustrated in (a) of FIG. 10, DC prediction may be performed by using the average value of the reference sample located above the current block and the reference sample located to the left of the current block.

For example, when the current block is a non-square block, neighboring samples adjacent to the left end and the upper end of the current block may be selectively used. When the current block is a rectangular block, as illustrated in (b) of FIG. 10, the prediction may be performed using the average value of the reference samples adjacent to a longer side among the left side and the upper side of the current block.

For example, when the size of the current block corresponds to a predetermined size or falls within a predetermined range, a predetermined number of reference samples, among the reference samples located above or to the left of the current block, are selected, and the prediction is performed using the average value of the selected reference samples. The predetermined size may be a fixed size of N×M, which is preset in the encoder/decoder. In this case, N and M are integers greater than 0, and N and M may be the same or different from each other. The predetermined range may mean a threshold value for selecting the reference samples for prediction of the current block. The threshold value may be set with at least one of a minimum value and a maximum value. The minimum value and/or the maximum value may be a fixed value or fixed values preset in the encoder/decoder, or a variable value or variable values that is/are encoded and then signaled by the encoder.

For example, one or more average values may be used to perform the prediction. When the current block is a square block or a non-square block, at least one of a first average value or a second average value may be used, in which the first average value is the average of the reference samples located above the current block and the second average value is the average of the reference samples located to the left of the current block. The DC prediction value of the current block may be the first average value or the second average value. Alternatively, the DC prediction value of the current block may be a weighted sum obtained by weighting the first average value and the second average value. For example, the weights for the first and second average values may be the same (that is, 1:1).

According to the above method, a shift operation can be used to calculate all of the DC values. For example, the method can be used even for the case where a sample length, which represents the width, the height, or the sum of the width and height of the current block, is not the power of two. The method may be applied to both luma DC prediction and chroma DC prediction. Alternatively, the method may be applied either to luma DC prediction or to chroma DC prediction.

For example, when the current block is a non-square block, the prediction may be performed based on either the width or the height of the current block. For example, a predicted value may be obtained by dividing the sum of the values of the upper reference sample and the left reference sample by the length of a longer side (namely, the width or the height) of the current block. In this case, the division operation using the value corresponding to the longer one among the width and the height may be performed by a shift operation.

For example, the DC prediction may be performed using a plurality of reference sample lines. For example, the prediction may be performed using two reference sample lines, as illustrated in (c) of FIG. 10.

For example, the average value of the reference samples included in the two reference sample lines may be determined as the DC prediction value of the current block.

Alternatively, different weights may be applied to the reference samples of the first adjacent line and the reference samples of the second adjacent line of the current block. For example, a weighted average of each sample in the first reference sample line and each sample in the second reference sample line is calculated by applying the weights 3:1 to each sample in the first reference sample line and each sample in the second reference sample line (that is, (3×the first line reference sample+the second line reference sample+2)>>2), and the average of the weighted averages may be determined as the DC prediction value of the current block. Alternatively, the resultant value of ((3×the first line reference sample−the second line reference sample)>>1) may be obtained, and the average of these values may be determined as the DC prediction value of the current block. The weights are not limited to the above example, and any weights may be used. In this case, the closer to the current block the reference sample line is, the larger the weight that is applied to the reference sample line. The number of reference sample lines that can be used is not limited to two, and three or more reference sample lines may be used for prediction.

The prediction may be performed using one or more average values generated using one or more reference samples. For example, at least one of the average value of the reference samples in the first reference sample line located above the current block, the average value of the reference samples in the second reference sample line located above the current block, the average value of the reference samples in the first reference sample line located to the left of the current block, and the average value of the reference samples in the second reference sample line located to the left of the current block may be used to perform the DC prediction.

Alternatively, the difference value between the reference sample in the first reference sample line and the reference sample in the second reference sample line may be used for the DC prediction. For example, the result value of (each reference sample in the first reference sample line+(each reference sample in the first reference sample line−each reference sample in the second reference sample line)>>1) is calculated, and the average value of these difference values may be determined as the DC prediction value of the current block.

For the planar mode, prediction may be performed with a weighted sum as a function of the distance from at least one reference sample to an intra prediction target sample located in the current block.

Filtering may be performed on reference samples of the current block or prediction samples (that is, predicted samples) of the current block. For example, after filtering is applied to reference samples, planar prediction may be performed, and then filtering may be performed on one or more prediction samples. Among the prediction samples, filtering may be performed on samples in one, two, or N sample lines located at the top boundary or the left boundary of the current block.

To perform the planar prediction, a weighted sum of one or more reference samples may be used. For example, five reference samples may be used, as illustrated in (d) of FIG. 10. For example, to generate a prediction sample for a target position [x, y], the reference samples r[−1, −1], r[x, −1], r[−1, y], r[W, −1], and r[−1, H] may be used. In this case, W and H are the width and the height of the current block, respectively. For example, prediction samples pred[x, y] can be generated using Equation 3. In Equation 3, a, b, c, d, and e represent weights. N may be $\log_2(a+b+c+d+e)$.

$$pred[x, y] = (aXr[-1, -1] + bXr[x, -1] + cXr[-1, y] + dXr[W, -1] + eXr[-1, H]) \gg N \qquad \text{[Equation 3]}$$

As another example, the planar prediction may be performed using a plurality of reference sample lines. For example, the planar prediction may be performed using a weighted sum of two reference sample lines. As another example, the planar prediction may be performed using a weighted sum of reference samples in the two reference sample lines. In this case, the reference samples selected from the second reference sample line may be samples adjacent to the reference samples selected from the first reference sample line. That is, when the reference sample located at the position (−1, −1) is selected, the reference sample located at the position (−2, −2) may be selected. The planar prediction may be performed by calculating a weighted sum of the selected reference samples, and in this case the same weights as those used for the DC prediction may be used.

A directional prediction mode refers to at least one of a horizontal mode, a vertical mode, and an angular mode having a predetermined angle.

In the horizontal mode or the vertical mode, prediction is performed using one or more reference samples arranged in a linear direction, i.e., in the horizontal direction or the vertical direction. A plurality of reference sample lines may be used. For example, when two reference sample lines are used, prediction may be performed using two reference samples arranged in a horizontal line or a vertical line. Similarly, when N reference sample lines are used, N reference samples in a horizontal line or a vertical line may be used.

For the vertical mode, the statistics of a first reference sample (e.g., r[x, −1]) on a first reference sample line and a second reference sample (e.g., r[x, −2]) on a second reference sample line may be used to perform the directional prediction.

For example, the predicted value of the vertical mode can be determined by calculating the result value of (3×r[x, −1]+r[x, −2]+2)>>2. Alternatively, the predicted value of the vertical mode can be determined by calculating the result value of (3×r[x, −1]−r[x, −2]+1)>>1. In yet another alternative, the predicted value of the vertical mode can be determined by calculating the value of (r[x, −1]+r[x, −2]+1)>>1.

For example, the change between each of the sample values on the vertical line may be considered. For example, the predicted value of the vertical mode can be determined by calculating the result value of (r[x, −1]+(r[x, −1]−r[x, −2])>>1). In this case, N may be an integer equal to or greater than 1. As N, a fixed value may be used. Alternatively, N may increase with an increase in the y coordinate of a prediction target sample. For example, N=y+1.

Even for the horizontal mode, one or more methods used for the vertical mode can be used.

For an angular mode of a certain angle, prediction may be performed using one or more reference samples arranged in an oblique direction from an intra prediction target sample of the current block, or one or more samples neighboring the reference samples located in the oblique direction. In this case, a total of N reference samples may be used, wherein N may be 2, 3, 4, 5, or 6. It is also possible to perform prediction by applying at least one of an N-tap filter to the N reference samples. Examples of the N-tap filter include a 2-tap filter, a 3-tap filter, a 4-tap filter, a 5-tap filter, and a 6-tap filter. At this time, at least one of the reference samples may be located above the current block and the rest may be located to the left of the current block. The reference samples located above the current block (or the reference samples located to the left of the current block) may be located in the same line or in different lines.

According to another embodiment, intra prediction may be performed based on position information. In this case, the position information may be encoded/decoded, and a reconstructed sample block located at the position described above may be derived as an intra predicted block of the current block. Alternatively, a block similar to the current block may be searched for by the decoder, and the found block may be derived as the intra predicted block of the current block.

According to a further embodiment, inter color component intra prediction is performed. For example, it is possible to intra-predict chroma components from the corresponding reconstructed luma component of the current block. Alternatively, it is possible to intra-predict one chroma component Cr from the corresponding reconstructed chroma component Cb of the current block.

In the various embodiments described above, reference samples that are not filtered may be used in the reference sample construction process for intra prediction. That is, directional prediction or non-directional prediction may be performed by using non-filtered reference samples. Since filtering is not performed in the reference sample construction process, the complexity of the encoder/decoder can be reduced and the hardware configuration can be simplified.

In intra prediction, one or more reference samples may be used for interpolation prediction. In intra prediction, at least one of the parameters among the number of reference sample lines, the number of interpolation filter taps, an interpolation filter coefficient, information on application/non-application of a filter, a weighted average calculation method, and weights may vary depending on at least one of the intra prediction mode of the current block, the size of the current block, and the shape of the current block.

Figure 11:
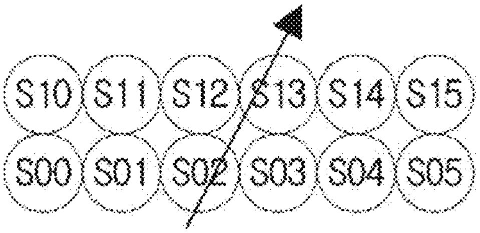
FIG. 11 is a diagram illustrating an embodiment in which two reference sample lines are used.

For example, one or more reference sample lines may be used, and the number of used reference sample lines may vary depending on one or more coding parameters. A plurality of reference sample lines may be used. FIG. 11 is a diagram illustrating an embodiment in which two reference sample lines are used.

The number of reference sample lines used for prediction varies depending on the intra prediction mode of the current block or the directionality of the intra prediction mode. For example, when the intra prediction mode of the current block is a non-directional mode such as a DC mode or a Planar mode, one reference sample line may be used. When the intra prediction mode of the current block is a directional mode, two reference sample lines may be used. For example, the number of reference sample lines may vary depending on whether the directional mode meets a predetermined condition or falls within a predetermined range. That is, when the directional mode is an even-numbered mode, two reference sample lines may be used. When the directional mode is an odd-numbered mode, one reference sample line may be used. For example, one reference sample line may be used for the horizontal mode or the vertical mode. For example, when the intra prediction mode falls within a predetermined range, a plurality of reference sample lines may be used. Otherwise, a single reference sample line may be used.

The number of reference sample lines may vary depending on the size and/or shape of the current block. For example, one reference sample line may be used when the current block is smaller than a predetermined size, and two reference sample lines may be used when the current block is larger than the predetermined size. That is, one reference sample line may be used when the current block is smaller than or equal to a size of 16×16 (that is, 256 samples), and two reference sample lines may be used when the current block is larger than the size of 16×16. Conversely, two reference sample lines may be used for a smaller block and one reference sample line may be used for a larger block. For example, two reference sample lines may be used when the current block is a square block, and one reference sample line may be used when the current block is a non-square block. The number of reference sample lines may vary depending on the location of the reference sample, that is, depending on whether the reference sample is located above the current block or to the left of the current block.

Alternatively, the number of reference sample lines may vary depending on the width (horizontal dimension) or the height (vertical dimension) of the current block. For example, when the width or the height of the current block is greater than a predetermined value, a plurality of reference sample lines may be used. In contrast, when the width or height of the current block is equal to or less than the predetermined value, one reference sample line may be used. For example, only one reference sample line may be used when the current block is a 4×N-size or N×4-size block, and two or more reference sample lines may be used otherwise. The same weight may be applied to two or more reference sample lines. For example, when the statistics of the width and height of the current block are within a predetermined range, a plurality of reference sample lines may be used. Otherwise, one reference sample line may be used.

The number of reference sample lines may vary depending on the intra prediction mode of the current block and the length (horizontal or vertical dimension, that is, width or height) of the current block. For example, when the intra prediction mode is the vertical direction mode, the number of reference sample lines may vary depending on the width (horizontal dimension) of the current block. For example, when the intra prediction mode of the current block is the horizontal direction mode, the number of reference sample lines may vary depending on the height (vertical dimension) of the current block. For example, when the intra prediction mode of the current block is the non-directional mode, the number of reference sample lines may vary depending on whether or not the length of the horizontal dimension and/or the vertical dimension of the current block corresponds to a predetermined value or falls within a predetermined range.

The number of reference sample lines may vary depending on the color component of the current block. For example, a plurality of (that is, two or more) reference sample lines may be used for the luma component, and one reference sample line may be used for each of the chroma components.

The number of reference sample lines may be differently set when the boundary of the current block corresponds to the boundary of a predetermined unit. For example, when the top boundary of the current block corresponds to the boundary of at least one of a picture, a slice, a tile, a coding tree unit (CTU), and an arbitrary-size block, one reference sample line may be used for the samples in the top boundary of the current block. Similarly, when the left boundary of the current block corresponds to the boundary of at least one of a picture, a slice, a tile, a coding tree unit (CTU), and an arbitrary-size block, one reference sample line may be used for the samples in the left boundary of the current block. The arbitrary block size may be signaled or predefined in the encoder/decoder.

When a plurality of reference sample lines are used, which reference sample lines are used may be set differently based on the coding parameter (for example, intra prediction mode). For example, a first reference sample line may be used when the intra prediction mode of the current block is an even-numbered mode, and a second reference sample line may be used when the intra prediction mode of the current block is an odd-numbered mode.

An interpolation filter may be used when performing directional prediction on the current block. The interpolation filter may be a filter having at least one of 2 taps, 4 taps, 6 taps, and N taps (N being a positive integer). Each of the interpolation filter taps has one or more filter coefficients.

For example, a 6-tap filter may be applied to samples S00 to S05 of FIG. 11 according to Equation 4, and the filter coefficients may range from a to f.

$$S\_F = (aXS00) + bXS01 + cXS02 + dXS03 + eXS04 + fXS05 + 2^{g-1}) \gg g \qquad \text{[Equation 4]}$$

The sum of the filter coefficients may be at least one of 32, 64, 128, 256, 512, 1024, and N, and each filter coefficient may be an integer value. The sum of the filter coefficients may be equal to the g-th power of 2. For example, when the sum of the filter coefficients is 1024, g may be 10.

The interpolation filter tap or the coefficient may vary depending on at least one of the size of the current block, the shape of the current block, the position of a prediction target sample, and the intra prediction mode of the current block.

The interpolation filter tap or the coefficient may vary depending on the intra prediction mode. For example, a 4-tap filter may be applied when the intra prediction mode is a predetermined mode, and a 2-tap filter may be applied when the intra prediction mode is not the predetermined mode. In addition, the filter coefficient may vary depending on the angle of the intra prediction mode. For example, for a 6-tap filter, two filter types (that is, Filter1 and Filter2) may be used, as shown in Table 1. The 6-tap filter may have filter coefficients {a, b, c, d, e, f} and the filter coefficients may be stored in the form of a lookup table (LUT). In this case, index information for referring to the lookup table may be encoded/decoded.

TABLE 1

| | 6-tab Filter1 | 6-tab Filter2 |
|---|---|---|
| angle 0 | {0, 256, 512, 256, 0, 0} | {47, 255, 416, 256, 49, 1} |
| angle 1 | {−3, 246, 509, 267, 6, −1} | {43, 247, 416, 264, 53, 1} |
| angle 2 | {−5, 237, 506, 278, 11, −3} | {40, 240, 414, 270, 58, 2} |
| angle 3 | {−7, 228, 502, 288, 17, −4} | {37, 233, 413, 277, 62, 2} |
| angle 4 | {−9, 218, 497, 299, 24, −5} | {34, 226, 412, 284, 66, 2} |
| angle 5 | {−10, 210, 493, 309, 29, −7} | {31, 218, 410, 292, 71, 2} |
| angle 6 | {−12, 200, 488, 320, 36, −8} | {28, 210, 407, 299, 77, 3} |
| angle 7 | {−13, 191, 482, 330, 43, −9} | {26, 203, 404, 306, 82, 3} |
| angle 8 | {−14, 182, 476, 340, 50, −10} | {23, 195, 401, 313, 88, 4} |
| angle 9 | {−15, 173, 470, 350, 57, −11} | {21, 188, 398, 320, 93, 4} |
| angle 10 | {−16, 163, 463, 361, 65, −12} | {19, 180, 393, 327, 100, 5} |
| angle 11 | {−16, 155, 456, 370, 72, −13} | {17, 173, 389, 333, 106, 6} |

TABLE 1-continued

| | 6-tab Filter1 | 6-tab Filter2 |
|---|---|---|
| angle 12 | {−16, 147, 449, 379, 79, −14} | {16, 167, 385, 339, 111, 6} |
| angle 13 | {−16, 138, 440, 388, 88, −14} | {14, 159, 380, 346, 118, 7} |
| angle 14 | {−17, 128, 433, 399, 96, −15} | {13, 153, 375, 351, 124, 8} |
| angle 15 | {−16, 121, 425, 407, 103, −16} | {11, 145, 370, 358, 131, 9} |
| angle 16 | {−16, 112, 416, 416, 112, −16} | {10, 138, 364, 364, 138, 10} |

As can be seen from Table 1, reference samples close to the angle line of the directional mode can be given a large weight. For example, a first filter may be applied when the intra prediction mode of the current block is an even-numbered mode, and a second filter may be applied when the intra prediction mode of the current block is an odd-numbered mode.

Alternatively, the first filter may be applied when the intra prediction mode is a mode having an angle corresponding to a multiple of 45 degrees, and the second filter may be applied when the intra prediction mode is a mode having one of the other angles. The first filter and the second filter differ in terms of at least one of the filter tap, the filter coefficient, and the filter shape.

The interpolation filter tap or the coefficient may vary depending on the position of a prediction target sample within the current block. For example, a first interpolation filter may be applied when the position of the prediction target sample is close to the reference sample, and a second interpolation filter may be applied when the position of the prediction target sample is far from the reference sample. A third, a fourth, . . . , and an N-th interpolation filter may be applied according to the position of the prediction target sample, and the number of interpolation filters may vary depending on the size and/or shape of the current block. The plurality of interpolation filters may have the same filter tap and different filter coefficients. Alternatively, the plurality of interpolation filters may have different filter taps and different filter coefficients.

For example, the first filter may be applied when the width or height of the current block has a first length, and the second filter may be applied when the width or height of the current block has a second length.

For example, the first filter may be applied when the width or height of the current block corresponding to the reference sample region used in the directional prediction mode is less than or equal to 8, and the second filter may be applied when the width or height is greater than 8.

For example, when the block size is 64 or less, the first filter may be used. Otherwise, the second filter may be used. The two types of filters may be selectively used based on the location of the prediction target sample. For example, when the intra prediction mode falls within a range of 34 to 66, the first filter may be applied to a prediction target sample located at an upper part of the current block, and the second filter may be applied to a prediction target sample located at a lower part of the current block. Similarly, when the intra prediction mode falls within a range of 2 to 33, the first filter may be applied to a prediction target sample located at a left part of the current block, and the second filter may be applied to a prediction target sample located at a right part of the current block. In the above embodiment, the first filter may be a cubic interpolation filter and the second filter may be a Gaussian interpolation filter.

For example, the filter coefficients can be adaptively selected and applied according to the width or height of the current block.

The interpolation filter tap or the filter coefficient may vary depending on the color component of the current block. For example, a first filter may be applied to a luma signal sample, and a second filter may be applied to chroma signal samples. For example, a 4-tap filter may be applied to a luma signal sample, and a 2-tap (bilinear) filter may be applied to chroma signal samples.

When a plurality of reference sample lines is used, the interpolation filter tap or the filter coefficient may vary depending on which reference sample line is used. For example, a first filter may be applied to a first reference sample line adjacent to the current block, and a second filter may be applied to a second reference sample line. When performing directional prediction as illustrated in FIG. 11, a first interpolation filter may be applied to samples S00 to S05 located in the first reference sample line, and a second interpolation filter may be applied to samples S12 to S13 located in a second reference sample line.

For example, a first filter may be applied to all of the plurality of reference sample lines. In this case, a filter coefficient applied to the first reference sample line and a filter coefficient applied to the second reference sample line may be different from each other.

At this time, when the direction of a directional prediction mode passes a predetermined position between two reference samples, reference samples selected from respective reference sample lines may differ in terms of the locations thereof. For example, a 2-tap interpolation filter is performed using samples S02 and S03 located in a first reference sample line, and a 2-tap interpolation filter is performed using samples S13 and S14 located in the second reference sample line.

When a plurality of reference sample lines is used, the interpolation filter may have a two-dimensional shape. For example, a first filter having the same shape as the example illustrated in FIG. 9 may be applied.

For example, reference samples which are not filtered by an interpolation filter may be used for directional prediction. For example, when a reference sample corresponding to a directional prediction mode exists at an integer position, the reference sample which is not filtered by an interpolation filter can be used. At least one of the 3-tap, 5-tap, and N-tap filters may be applied to the reference sample to which the interpolation filter is not applied. For example, a {1, 2, 1} filter may be applied to a reference sample. Whether to apply the filter to a reference sample may be determined based on at least one of the intra prediction mode of the current block, the size of the current block, and the shape of the current block.

For example, when a plurality of reference sample lines is used, an interpolation filter or a weighted average may be applied to a plurality of values obtained by applying an interpolation filter to each of the reference sample lines. For example, as in Equation 5, a weighted average of values S-F1 and S_F2 may be derived as a prediction value S_P, in which the value S_F1 is obtained by applying a first interpolation filter to a first reference sample line and the value S_F2 is obtained by applying a second interpolation filter to a second reference sample line. Here, h and i may be weights, and h+i may be a value corresponding to the j-th power of 2. For example, h=3, i=1, and j=2. Alternatively, h, i, and j may all be 1. The first interpolation filter and the second interpolation filter may be of different filter types. For example, the first interpolation filter and the second interpolation filter may differ in terms of at least one of the filter tap and the filter coefficient.

$$S\_P = \left(hXS\_F1 + iXS\_F2 + 2^{j-1}\right) \gg j \quad \text{[Equation 5]}$$

Alternatively, a value (for example, S_F1+(S_F1−S_F2)>>j) obtained by considering the amount of change between each of the angular lines, such as the vertical prediction, may be determined as a predicted value.

In the above, it has been described that different interpolations are performed for a first reference sample line adjacent to the current block and for a second reference sample line, among a plurality of reference sample lines. However, the operation described above is not limited to the first reference sample line and the second reference sample line among the plurality of reference sample lines. For example, the first reference sample line and the second reference sample line may be replaced with an arbitrary first reference sample line and an arbitrary second reference sample line, respectively, of the plurality of reference sample lines.

In applying the interpolation filters, padding may be performed when using samples that are positioned outside of the configured reference sample area. For example, when a directional prediction mode corresponds a direction passes between reference samples S04 and S05 in FIG. 11, when applying a 6-tap filter, two samples positioned on the right side and deviated from the direction of the directional prediction mode may be padded with the available reference sample S05, and then the interpolation filter may be applied. In case of an angular mode, the configured reference sample may be re-configured based on an angular prediction mode. For example, when the angular prediction mode is a mode using all of left side and upper side reference samples, a one-dimensional array may be configured for the left side or upper side reference sample. Alternatively, an upper side reference sample may be configured by shifting a left side reference sample, or an upper side reference sample may be configured by using a weighted sum of at least one left side reference sample.

Angular intra predictions or interpolation filterings different from each other may be performed on a predetermined sample group unit of a current block. The predetermined sample group unit may be a block, a sub-block, a line or a singular sample.

According to another embodiment of the present invention, an inter color component intra prediction may be performed. The inter color component intra prediction includes a color component block restructuring step, a prediction parameter deriving step, and/or an inter color component prediction execution step. The term 'color component' may refer to at least any one of a luma signal, a chroma signal, Red, Green, Blue, Y, Cb, and Cr. A prediction of a first color component can be performed by using at least any one of a second color component, a third color component, and a fourth color component. The signals of the color components used for the prediction may include at least any one of an original signal, a reconstructed signal, a residual signal, and a prediction signal.

When performing an intra prediction for a second color component target block, a sample of a first color component block corresponding block that corresponds to the second color component target block, a sample of a neighbor block of the first color component corresponding block, or both of the samples may be used. For example, when performing an intra prediction for a chroma component block Cb or Cr, a reconstructed luma component block Y corresponding to the chroma component block Cb or Cr may be used.

When predicting the chroma components on the basis of the luma component, the prediction may be performed according to Equation 6.

$$Pred_C(i, j) = \alpha \cdot rec'_L(i, j) + \beta \quad \text{[Equation 6]}$$

In Equation 6, $Pred_C(i, j)$ represents a predicted chroma sample of the current block, and $rec_L(i, j)$ represents a reconstructed luma sample of the current block. At this time, $rec_L'(i, j)$ may be a down-sampled reconstructed luma sample. Parameters a and R may be derived by minimizing a regression error between the reconstructed neighboring luma sample and the reconstructed neighboring chroma sample around the current block.

There are two modes for predicting the chroma components using the luma component. The two modes may include a single-model mode and a multiple-model mode. The single-model mode may use one linear model when predicting the chroma components from the luma components for the current block. The multiple-model mode may use two linear models.

In the multiple-model mode, the samples adjacent to the current block (that is, adjacent luma samples and adjacent chroma samples) may be classified into two groups. That is, the parameters a and p for each of the two groups may be derived. Further, the luma samples of the current block may be classified according to the rules used for classification of the luma samples adjacent to the current block.

For example, a threshold value for classifying the adjacent samples into two groups may be calculated. The threshold value may be calculated using an average value of the reconstructed adjacent luma samples. However, the calculation of the threshold value is not limited thereto. At least one of various statistical values recognized in the present specification may be used instead of the average value. When the values of the adjacent samples are larger than the threshold value, the adjacent samples may be classified into a first group. Otherwise, the adjacent samples may be classified into a second group.

Although it is described that the multiple-model mode uses two linear models in the embodiment described above, the present invention is not limited thereto, and may cover other cases in which two or more linear models are used. When N linear models are used, samples may be classified into N groups. To do so, N−1 threshold values may be calculated.

As described above, when predicting a chroma component from a luma component, a linear model can be used. In this case, the linear model may include a simple linear model (hereinafter referred to as "LM1"), a complex linear model (hereinafter referred to as "LM2"), and a complex filter linear model (hereinafter, referred to as "LM3"). Parameters of the models described above may be derived by minimizing regression error between the reconstructed luma samples around the current block and the corresponding reconstructed chroma samples around the current block.

Figure 12:
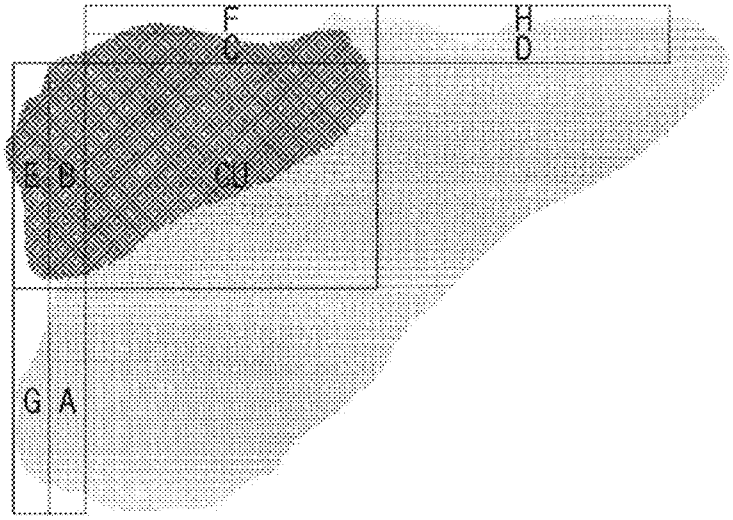
FIG. 12 is a diagram for describing neighboring samples of a current block used to derive a parameter of linear models which are used for predicting a chroma component from a luma component.

FIG. 12 is a diagram for describing "neighboring samples of a current block" (hereinafter referred to as "adjacent data set") used to derive the parameters of the models.

The adjacent data set for deriving the parameters of the LM1 may be composed of a pair of samples comprising a luma sample and a chroma sample in each of a line area B and a line area C illustrated in FIG. 12. The adjacent data set for deriving the parameters of the LM2 and LM3 may be composed of a pair of samples comprising a luma sample and chroma sample in each of a line area B, a line area C, a line area E, and a line area F illustrated in FIG. 12.

However, the adjacent data set is not limited to the examples described above. For example, to cover various linear relationships between luma and chroma samples in the current block, N adjacent data sets may be used for each mode. For example, N may be an integer of 2 or more, and specifically 3.

The parameters of the linear model may be calculated using both an upper template and a left template. Alternatively, there are two LM modes (an LM_A mode and an LM_L mode), and the upper template and the left template may be used in the LM_A mode and the LM_L mode, respectively. That is, in the LM_A mode, the linear model parameters may be obtained using only the upper template. When the position of the upper left corner sample of the current block is (0, 0), the upper template may be extended to a range from (0, −n) to (W+H−1, −n). In this case, n is an integer equal to or greater than 1. That is, in the LM_L mode, the linear model parameters may be obtained using only the left template. The left template may be extended to a range from (−n, 0) to (−n, H+W−1). In this case, n is an integer equal to or greater than 1.

A power of two numbers of samples can be used to derive the parameters of the linear model. When the current chroma block is a non-square block, the samples used to derive the parameters of the linear model may be determined based on the number of samples on a shorter side, among the horizontal side and the vertical side of the current block. According to one embodiment, when the size of the current block is n×m (where n>m), m samples of the n adjacent samples adjacent to the top boundary of the current block may be selected, for example, by performing sub-sampling uniformly. In this case, the number of samples used to derive the parameters of the linear model may be 2m. As another example, when the size of the current block is n×m (where n>m), m samples of the n adjacent samples adjacent to the top boundary of the current block may not be used. For example, of the n samples, m samples that are farthest from the shorter one of the horizontal side and the vertical side of the current block may not be used. In this case, the number of samples used to derive the parameters of the linear model may be n (n-m samples adjacent to the top boundary of the current block+m samples adjacent to the left boundary of the current block).

Alternatively, when performing an intra prediction for a chroma component block Cr, a chroma component block Cb may be used. Alternatively, when performing an intra prediction for a fourth color component block, at least one of a first color component block, a second color component block, and a third color component, all of which correspond to the fourth color component block, may be used.

Whether or not to perform an inter color component intra prediction may be determined based on at least any one of the size and the shape of a current target block. For example, when the size of the target block is equal to that of a coding tree unit (CTU), larger than a predetermined size, or within a predetermined size range, the inter color component intra prediction for the target block can be performed. Alternatively, when the shape of the target block is a predetermined shape, the inter color component intra prediction for the target block can be performed. The predetermined shape may be a square shape. In this case, when the target block has an oblong shape, the inter color component intra prediction for the target block may not be performed. Meanwhile, when the predetermined shape is an oblong shape, the embodiment described above inversely operates.

Alternatively, whether or not to perform an inter color component intra prediction for a prediction target block may be determined based on a coding parameter of at least any one block selected from among a corresponding block corresponding to the prediction target block and neighbor blocks of the corresponding block. For example, when the corresponding block has been predicted through an intra prediction method in a constrained intra prediction (CIP) environment, an inter color component intra prediction for the prediction target block may not be performed. Alternatively, when the intra prediction mode of the corresponding block is a predetermined mode, an inter color component intra prediction for the prediction target block can be performed. Further alternatively, whether or not to perform an inter color component intra prediction may be determined on the basis of at least any one of CBF information of the corresponding block and CBF information of the neighbor blocks thereof. The coding parameter is not limited to a prediction mode of a block but various parameters that can be used for encoding/decoding may be used.

The color component block restructuring step will be described below.

Figure 13:
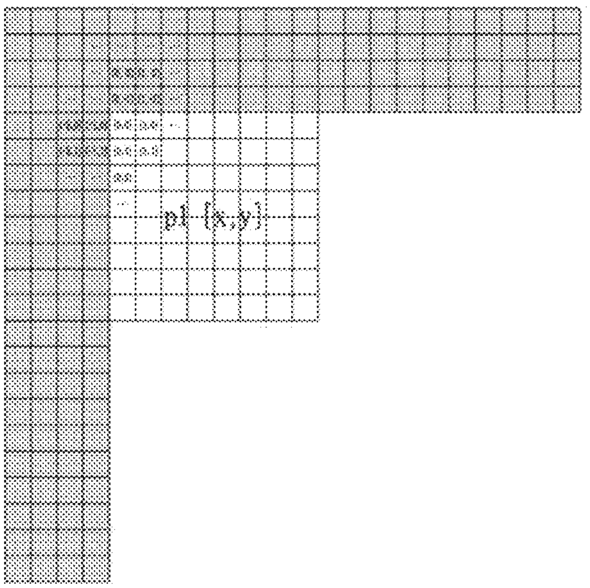
FIG. 13 is an exemplary diagram illustrating a process of restructuring a color component block.
Figure 13:
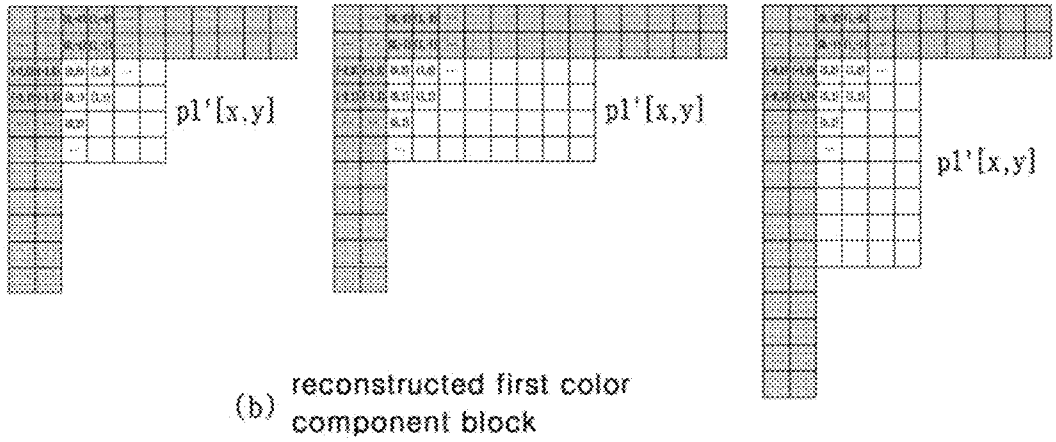

When predicting a second color component block by using a first color component block, the first color component block may be restructured. For example, when an image has an YCbCr color space and when a sampling ratio of color components is one of 4:4:4, 4:2:2, and 4:2:0, the block sizes of color components may differ from each other. Therefore, when predicting a second color component block using a first color component block having a different size from the second color component block, the first color component block may be restructured such that the block sizes of the first color component and the second color component are equalized. The restructured block may include at least any one of a sample in the first color component block that is a corresponding block and a sample in a neighbor block of the first color component block. FIG. 13 is an exemplary diagram illustrating a process of restructuring a color component block.

In (a) of FIG. 13, p1[x, y] represents a sample at a position (x, y) in the first color component block. In (b) of FIG. 13, p1'[x, y] represents a sample at a position (x, y) in the restructured block that is produced by restructuring the first color component block.

When the first color component block has a larger size than the second color component block, the first color component block is down-sampled to have a size equal to that of the second color component block. The down-sampling may be performed by applying an N-tap filter to one or more samples (N is an integer equal to or larger than 1). For the down-sampling, at least any one equation of Equation 7 to Equation 11 may be used. In the case in which any one down-sampling method among various down-sampling methods is selectively used, an encoder may select one down-sampling method as a predetermined down-sampling method. For example, the encoder may select a down-sampling method having optimal effects. The selected down-sampling method is encoded and signaled to a decoder. The signaled information may be index information indicating the down-sampling method.

$$p1'[x, y] = (p1[2x, 2y] + p1[2x, 2y+1] + 1) \gg 1 \quad \text{[Equation 7]}$$

$$p1'[x, y] = (p1[2x+1, 2y] + p1[2x+1, 2y+1] + 1) \gg 1 \quad \text{[Equation 8]}$$

$$p1'[x, y] = (p1[2x-1, 2y] + 2xp1[2x, 2y] + p1[2x+1, 2y] + 2) \gg 2 \quad \text{[Equation 9]}$$

$$p1'[x, y] = (p1[2x-1, 2y+1] + 2*p1[2x, 2y+1] + p1[2x+1, 2y+1] + 2) \gg 2 \quad \text{[Equation 10]}$$

$$p1'[x, y] = (p1[2x-1, 2y] + 2*p1[2x, 2y] + p1[2x+1, 2y] + p1[2x-1, 2y+1] + 2*p1[2x, 2y+1] + p1[2x+1, 2y+1] + 4) \gg 3 \quad \text{[Equation 11]}$$

The down-sampling method performed with respect to two or more samples is not limited to any one of the examples of Equation 7 to Equation 11. For example, two or more samples used to calculate a down-sampled value p1'[x, y] may be selected from a sample group consisting of a sample p1[2x, 2y] and neighbor samples thereof. The neighbor samples may be ones selected among p1[2x−1, 2y−1], p1[2x−1, 2y], p1[2x−1, 2y+1], p1[2x, 2y−1], p1[2x, 2y+1], p1[2x+1, 2y−1], p1[2x+1, 2y], and p1[2x+1, 2y+1]. The down-sampling can be performed by calculating the average or the weighted average of two or more samples.

Alternatively, the down-sampling may be performed in a manner of selecting a specific sample among one or more samples. In this case, at least any one of the following equations, Equation 12 to Equation 15, may be used for the down-sampling.

$$p1'[x, y] = p1[2x, 2y] \quad \text{[Equation 12]}$$

$$p1'[x, y] = p1[2x, 2y+1] \quad \text{[Equation 13]}$$

$$p1'[x, y] = p1[2x+1, 2y] \quad \text{[Equation 14]}$$

$$p1'[x, y] = p1[2x+1, 2y+1] \quad \text{[Equation 15]}$$

When the first color component block has a smaller size than the second color component block, the first color component block is up-sampled to be restructured such that the sizes of the first color component block and the second color component block are equalized. In this case, the up-sampling is performed according to Equation 16.

$$p1'[2x, 2y] = p1[x, y], \quad \text{[Equation 16]}$$

$$p1'[2x+1, 2y] = (p1[x, y] + p1[x+1, y] + 1) \gg 1,$$

$$p1'[2x, 2y+1] = (p1[x, y] + p1[x, y+1] + 1) \gg 1,$$

$$p1'[2x+1, 2y+1] = (p1[x+1, y] + p1[x, y+1] + 1) \gg 1$$

In the restructuring process, a filter may be applied to one or more samples. For example, the filter may be applied to one or more samples included in at least any one of the first color component block (i.e. corresponding block), neighbor blocks of the corresponding block, the second color component block (i.e. target block), and neighbor blocks of the target block.

In the reference sample restructuring step described above, an indicator corresponding to a predetermined reference sample line among a plurality of reference sample lines may be signaled. In this case, in the restructuring process, the restructuring is performed using the predetermined reference sample line corresponding to the signaled indicator.

In the restructuring process, when a boundary of the second color component block (target block) or a boundary of the first color component block (corresponding block) is a boundary of a predetermined region, the reference samples used for the restructuring may be differently selected. In this case, the number of reference sample lines at the upper side may differ from the number of reference sample lines at the left side. The predetermined region may be at least any one of a picture, a slice, a tile, a CTU, and a CU.

For example, when the upper boundary of the first color component corresponding block is the boundary of the predetermined region, the reference samples at the upper side may not be used for the restructuring but only the reference samples at the left side may be used for the restructuring. When the left boundary of the first color component corresponding block is the boundary of the predetermined region, the reference samples at the left side may not be used for the restructuring but only the reference samples at the upper side may be used for the restructuring. Alternatively, both of N reference sample lines at the upper side and M reference sample lines at the left side may be used for the restructuring, in which N may be smaller than M. For example, when the upper boundary corresponds to the boundary of the predetermined region, N may be 1. Meanwhile, when the left boundary corresponds to the boundary of the predetermined region, M may be 1.

Alternatively, the restructuring may be performed by using N reference sample lines at the upper side and M reference left sample lines at the left side of the first color component corresponding block, regardless of whether the boundary of the predetermined region is the upper boundary or the left boundary of the first color component block.

Figure 14:
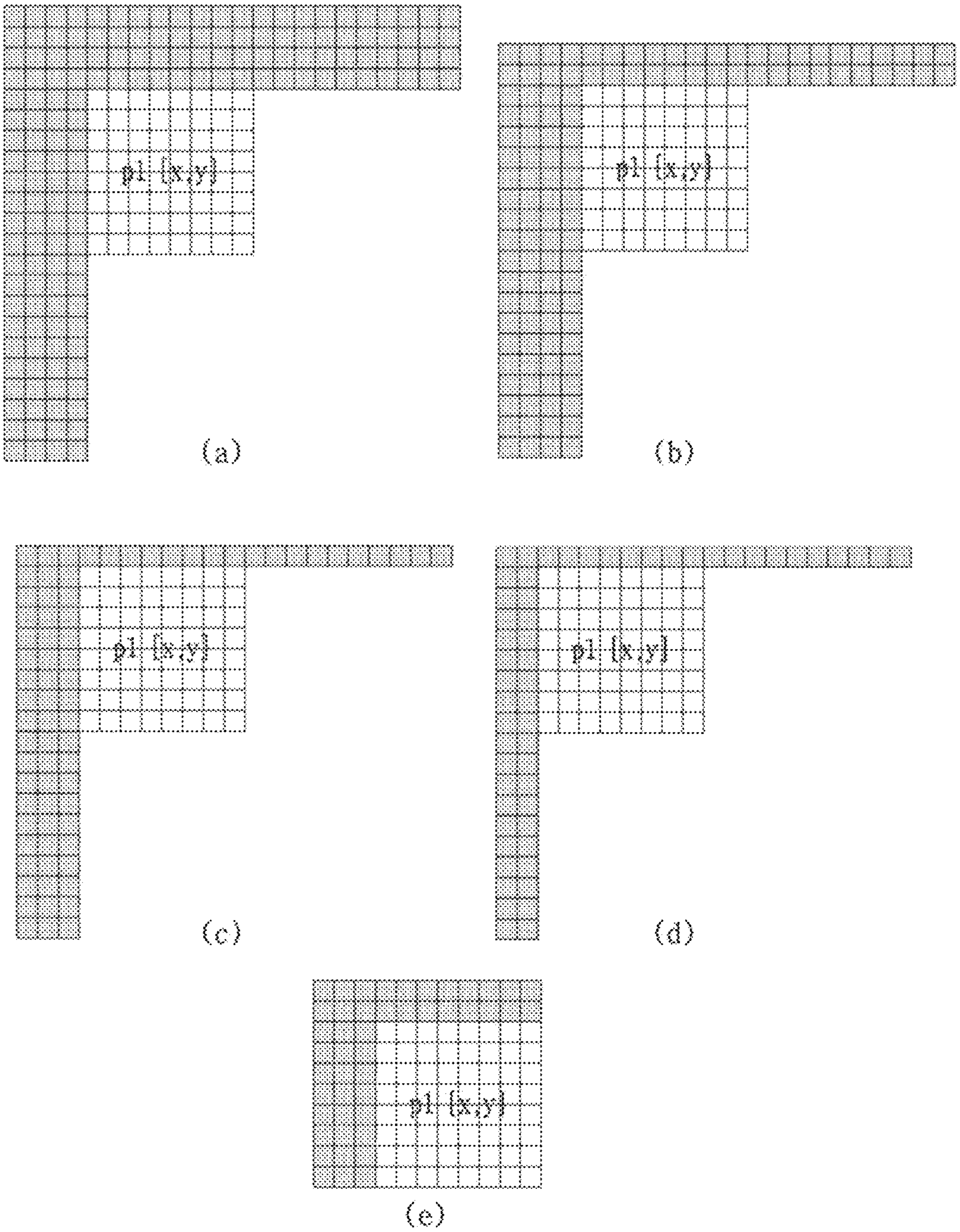
FIG. 14 is a diagram illustrating an embodiment performing restructuring by using a plurality of upper-side reference sample lines and/or a plurality of left-side reference sample lines.

FIG. 14 is a diagram illustrating an embodiment performing restructuring by using a plurality of upper-side reference sample lines and/or a plurality of left-side reference sample lines.

As illustrated in (a) of FIG. 14, the restructuring may be performed using four upper-side reference sample lines and four left-side reference sample lines.

For example, when the upper boundary or the left boundary of the first color component corresponding block is the boundary of the predetermined region, the number of the upper-side reference sample lines and the number of the left-side reference sample lines used for the restructuring may differ from each other. For example, as illustrated in (b) to (d) of FIGS. 14, any of the following combinations may be used for the restructuring: two upper-side reference sample lines and four left-side reference sample lines; one upper-side reference sample line and three left-side reference sample lines; and one upper-side reference sample line and two left-side reference sample lines.

The number of reference sample lines used for the restructuring is not limited to the above combinations. That is, N upper-side reference samples lines and M left-side reference sample lines may be used in which N and M are equal to or different from each other. When both of the upper boundary and the left boundary of the corresponding block correspond to the boundary of the predetermined region, N and M may be equal to each other. That is, N and M may be both 1. Alternatively, N may be set smaller than M under the same condition. This is because more resources (memory) are required for the upper-side reference sample lines than for the left-side reference sample lines.

Alternatively, as illustrated in (e) of FIG. 14, one or more reference samples within a region having a vertical length and a horizontal length not larger than those of the first color component corresponding block may be used for the restructuring.

When performing the restructuring process, the reference samples of the first color component corresponding block may be differently set depending on any one of the block size, the block shape, and the coding parameter of at least any one block selected among the first color component corresponding block, neighbor blocks thereof, the second color component target block, and neighbor blocks thereof.

For example, among samples in the first color component corresponding block and the neighbor blocks thereof, samples in blocks whose encoding mode is an inter frame encoding mode are not used but only samples in blocks whose encoding mode is an intra encoding mode are used for the restructuring.

Figure 15:
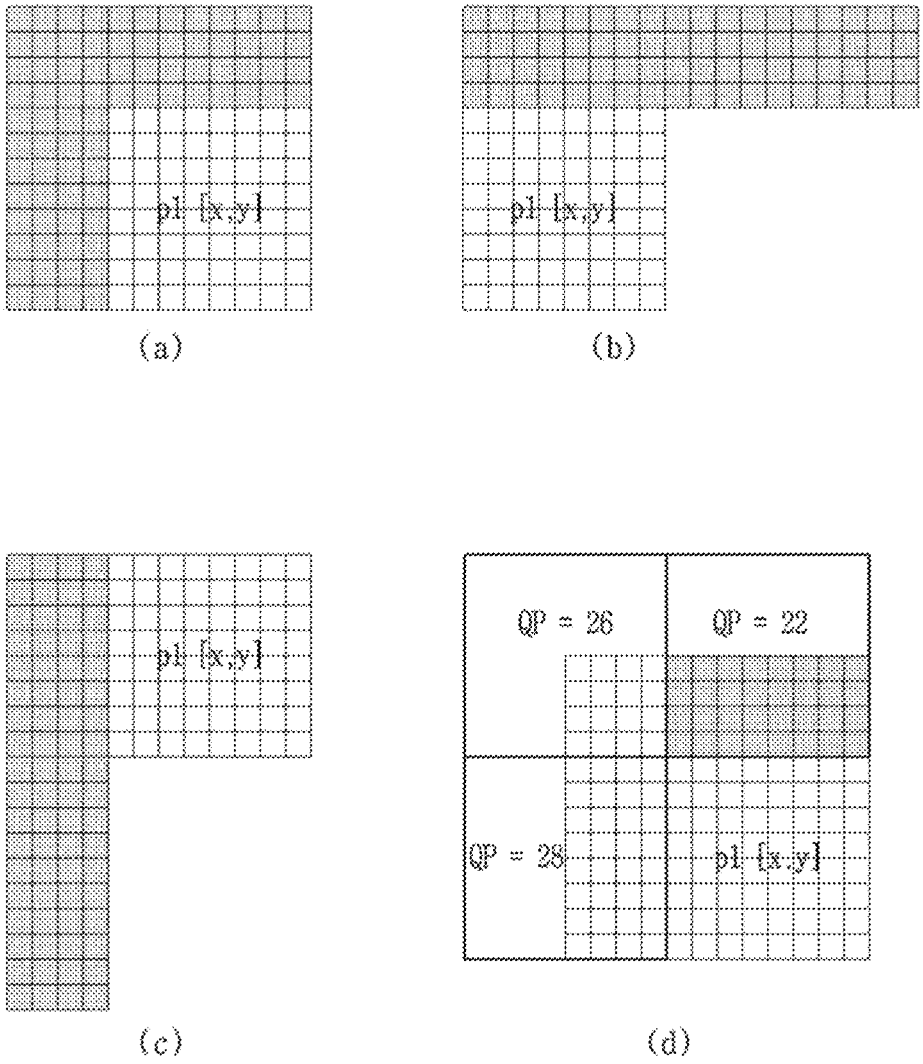
FIG. 15 is an exemplary diagram illustrating reference samples used for the restructuring in accordance with an intra prediction mode or a coding parameter of a corresponding block.

FIG. 15 is an exemplary diagram illustrating reference samples used for the restructuring in accordance with an intra prediction mode or a coding parameter of a corresponding block. The restructuring of the reference samples of the first color component block may be differently performed in accordance with the intra prediction modes of the first color component corresponding block. For example, when the intra prediction mode of the corresponding block is a non-angular mode, such as a DC mode and a planar mode, or an angular mode in which both of the upper-side reference samples and the left-side reference samples are used, as illustrated in (a) of FIG. 15, at least one of the upper-side reference samples and the left-side reference samples is used for the restructuring. Alternatively, when the intra prediction mode of the corresponding block is an angular mode in which both of the upper-side reference samples and the upper-right-side reference samples are used, as illustrated in (b) of FIG. 15, at least one of the upper-side reference samples and the upper right-side reference samples is used for the restructuring. Alternatively, when the intra prediction mode of the corresponding block is an angular mode in which both of the left-side reference samples and the lower left-side reference samples are used, as illustrated in (c) of FIG. 15, at least one of the left-side reference samples and the lower left-side reference samples is used for the restructuring.

Alternatively, the reference samples used to restructure the first color component corresponding block are differently selected in accordance with the quantization parameter of at least any one of the first color component corresponding block and the neighbor blocks thereof. For example, as illustrated in (d) of FIG. 15, reference samples in an upper block that is disposed at the upper side of the corresponding block and whose neighbor blocks have a relatively small quantization parameter value QP are used for the restructuring of the corresponding block.

Alternatively, when the second color component target block has an oblong shape, reference samples disposed around a first color component corresponding block having a square shape are used for the restructuring.

Alternatively, when the second color component target block is partitioned into two sub-blocks (for example, two 16×8-size sub-blocks) and when the first color component corresponding block is a 32×16-size block, reference samples disposed around a 32×32-size block are used for the restructuring of the corresponding block. In this case, as reference samples of the first color component block corresponding to a second 16×8-size sub-block disposed at a lower side among the partitioned two sub-blocks of the second color component target block, reference samples around a restructured 32×32-size block may be shared.

Hereinbelow, the prediction parameter deriving step will be described.

A prediction parameter can be derived using at least any one of reference samples of the restructured first color component corresponding block and reference samples of the second color component prediction target block. Hereinafter, the terms ‘first color component’ and ‘first color component block’ may respectively refer to a restructured first color component and a restructured first color component block.

Figure 16:
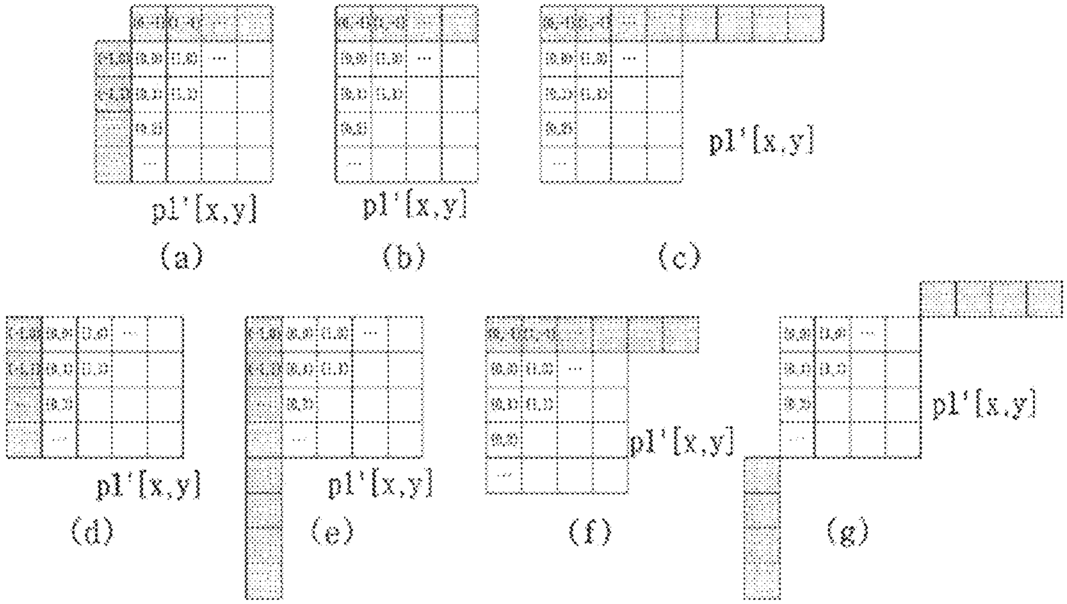
FIG. 16 is a diagram illustrating an exemplary restructured first color component corresponding block when a second color component prediction target block is a 4×4 block.

FIG. 16 is a diagram illustrating an exemplary restructured first color component corresponding block when a second color component prediction target block is a 4×4 block. In this case, the number of reference sample lines may be N.

The prediction parameter may be derived using reference samples disposed at the upper side and the left side of the restructured first color component corresponding block or of the second color component prediction target block as illustrated in (a) of the FIG. 16.

For example, the prediction parameter can be derived by adaptively using the reference samples of the restructured first color component, on the basis of the intra prediction mode of the first color component corresponding block. In this case, the reference samples of the second color component can be adaptively used on the basis of the intra prediction mode of the first color component corresponding block.

When the intra prediction mode of the first color component corresponding block is a non-angular mode such as a DC mode or a planar mode, or an angular mode in which both of upper-side reference samples and left-side reference samples are used, reference samples at the upper side and the left side of the first color component corresponding block can be used as illustrated in (a) of FIG. 16.

When the intra prediction mode of the first color component corresponding block is a non-angular mode in which upper-side reference samples are used, reference samples at the upper side of the first color component corresponding block may be used as illustrated in (b) or (c) of FIG. 16.

When the intra prediction mode of the first color component corresponding block is an angular mode in which left side reference samples are used, reference samples at the left side of the first color component corresponding block may be used as illustrated in (d) or (e) of FIG. 16.

Alternatively, when the intra prediction mode of the first color component corresponding block is an angular mode, reference samples used in each prediction mode can be used as reference samples of the first color component. For example, when the intra prediction mode is a vertical mode, reference samples illustrated in (b) of FIG. 16 may be used. When the intra prediction mode is a horizontal mode, reference samples illustrated in (d) of FIG. 16 may be used. When the intra prediction mode is an up-right diagonal mode, reference samples illustrated in (c) of FIG. 16 may be used. When the intra prediction mode is a down-left diagonal mode, reference samples illustrated in (e) of FIG. 16 may be used. When the intra prediction mode is a mode between the vertical mode and the up-right diagonal mode, reference samples illustrated in (f) of FIG. 16 may be used. When the intra prediction mode is an angular mode of a 45° diagonal direction, upper right reference samples, lower left reference samples, or both are used as illustrated in (g) of FIG. 16. Reference samples that are differently selected for each intra prediction mode are stored in a format of a look-up table so as to be conveniently used.

The prediction parameter may be derived by adaptively using the reference samples of the first color component or the second color component in accordance with the size and/or the shape of the first color component block and/or the second color component block.

For example, when the second color component target block has a 64×64 size, 32, 16, or 8 reference samples among reference samples at the upper side or the left side of the first color component block or the second color component block may be used. As described above, when the size of the second color component target block is a predetermined size, the reference samples of the first or second color component block may be adaptively used. The predetermined size is not limited to the 64×64 size, but it may be a size signaled through a bitstream or a size derived on the basis of the coding parameter of a current block or a neighbor block thereof.

Alternatively, when the second color component target block has an oblong shape, reference samples adjacent to a longer side, which is a vertical side or a horizontal side, of the second color component target block may be used. For example, when the target block has a block size of 32×8, reference samples at the upper side of the first color component or the second color component block may be used.

Alternatively, when the second color component target block has an oblong shape, reference samples around a square block can be used. For example, when the target block is a 32×8 block, reference samples around a 32×32 block can be used.

The prediction parameter can be derived using reference samples around the restructured first color component block and reference samples around the second color component block. The prediction parameter can be derived on the basis of any one of the factors including a correlation, a change, an average value, and a distribution of color components. In this case, any one of the methods of Least Squares (LS), Least Mean Squares (LMS), etc. may be used.

When deriving the prediction parameters through the LMS method, the prediction parameters may be a and b, a and p, or both. Prediction parameters that can minimize an error between the reference samples of the first color component and the reference samples of the second color component can be derived by Equation 17.

$$E(a,b)=\sum_{n=0}^{N-1}(p2_n-(a\cdot(p1')_n+b))^2 \quad \text{[Equation 17]}$$

In Equation 17, $p2_n$ represents a reference sample of the second color component, and $p1'_n$ represents a reference sample of the restructured first color component. N is the number of used reference samples arranged in a vertical direction or a horizontal direction, and a and b represent prediction parameters.

In this case, a correlation between the reference samples can be calculated by Equation 18.

$$k=\mathrm{Max}(0,\ BitDepth+\log2(N)-15) \quad \text{[Equation 18]}$$

-continued $$L=\left(\sum_{y=0}^{N-1}p1'[-1,y]+\sum_{x=0}^{N-1}p1'[x,-1]\right)\gg k$$

$$C=\left(\sum_{x=0}^{N-1}p2[-1,y]+\sum_{x=0}^{N-1}p2[x,-1]\right)\gg k$$

$$LL=\left(\sum_{x=0}^{N-1}p1'[-1,y]2+\sum_{x=0}^{N-1}p1'[x,-1]2\right)\gg k$$

$$LC=\left(\sum_{x=0}^{N-1}p1'[-1,y]\times p2[-1,y]+\sum_{x=0}^{N-1}p1'[x,-1]\times p2[x,-1]\right)\gg k$$

Figure 17:
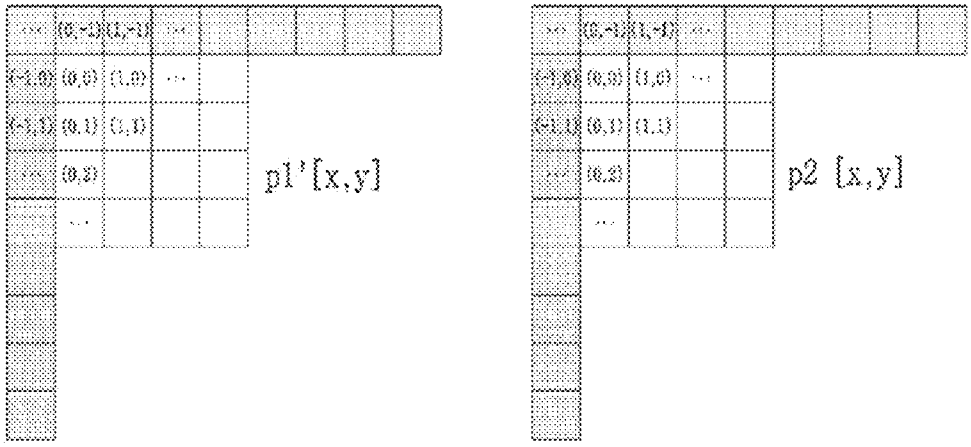
FIG. 17 is a diagram illustrating a sample of a first color component and a sample of a second color component.

In Equation 18, BitDepth represents a bit depth. p1' represent a sample of the restructured first color component, and p2 represents a sample of the second color component. FIG. 17 is a diagram illustrating a sample of a first color component and a sample of a second color component.

When there is a region with no reference sample in the process of deriving a prediction parameter, the prediction parameter can be derived using only existing samples.

One or more prediction parameters can be derived. For example, a first prediction parameter may be derived from reference samples having values satisfying a specific requirement among reference samples used to derive prediction parameters. In addition, a second prediction parameter may be derived from referenced samples having values that do not satisfy the specific requirement. The specific requirement may be a condition in which the value of a reference sample is less than a statistic figure (for example, an average value).

According to another embodiment of the present invention, a basic prediction parameter (default parameter) may be used instead of deriving a prediction parameter from values of reference samples. The default parameters may be predefined in the encoder and the decoder. For example, the prediction parameters a and b may be respectively 1 and 0.

Alternatively, when deriving prediction parameters from reference samples, the derived prediction parameters may be encoded and decoded.

When performing an inter color component prediction among color components Y, Cb, and Cr, prediction parameters used to predict color components Cb and Cr can be derived from a color component Y. Prediction parameters used to predict a color component Cr can be derived from a color component Cb. Alternatively, as prediction parameters for predicting a color component Cr, the prediction parameters that have been derived from a color component Y to predict a color component Cb can be used as they are, instead of deriving new prediction parameters for a prediction of the color component Cr.

Hereinbelow, the inter color component prediction execution step will be described.

As described above, after prediction parameters are derived, an inter color component intra prediction can be performed using at least any one of the derived prediction parameters.

For example, a prediction of a second color component target block can be performed by applying the derived prediction parameter to a reconstructed signal of the restructured first color component, according to Equation 19.

$$p2[x,y]=a\times p1'[x,y]+b \quad \text{[Equation 19]}$$

In Equation 19, p2[x, y] represents a prediction block of the second color component target block. p1'[x, y] represents the first color component block or the restructured first color component block.

Alternatively, the prediction of the second color component target block can be performed by applying the derived prediction parameter to a residual signal of the restructured first color component, according to Equation 20.

$$p2[x, y] = \text{p2\_pred}[x, y] + a \times p1'\text{\_residual}[x, y] \quad \text{[Equation 20]}$$

In Equation 20, p1'_residual represents a residual signal of the first color component and p2_pred represents a prediction signal obtained by performing an intra prediction with respect to the second color component target block.

When the number of the derived prediction parameters is one or more, one or more prediction parameters may be applied to the reconstructed sample of the first color component. For example, when the reconstructed sample of the first color component satisfies a specific requirement, the inter color component intra prediction may be performed by applying the first prediction parameter derived from the reference samples that satisfy the specific requirement. Meanwhile, when the reconstructed sample of the first color component does not satisfy the specific requirement, the inter color component intra prediction may be performed by applying the second prediction parameter derived from the reference samples that do not satisfy the specific requirement. The specific requirement means a condition that the value of a reference sample is less than a statistic figure (for example, an average value) of the reference samples of the first color component.

The inter color component prediction method may be used in an inter prediction mode. For example, when performing the inter prediction on the current block, inter prediction is performed for a first color component, and inter color component prediction or prediction combining inter prediction and inter color component prediction may be performed for a second color component. For example, the first color component may be a luma component, and the second color component may be a chroma component. In addition, the inter color component prediction may be performed adaptively according to the coding parameters of the first color component. For example, it is possible to determine whether to perform inter color component prediction according to CBF information of the first color component. The CBF information may be information indicating whether a residual signal exists or not. That is, when the CBF of the first color component is 1, inter color component prediction may be performed on the second color component. When the CBF of the first color component is 0, inter color component prediction may not be performed on the second color component, and the inter prediction may be performed on the second color component. Alternatively, a flag indicating whether or not to perform the inter color component prediction may be signaled.

Intra prediction may be performed by combining one or more intra prediction modes. For example, an intra prediction block of the current block may be constructed by calculating a weighted average of blocks predicted using a predetermined non-directional intra prediction mode and blocks predicted using a predetermined directional intra prediction mode. For example, the intra prediction may be performed by calculating a weighted sum of a value predicted using the inter color component prediction mode and a value predicted using a predetermined intra prediction mode. In this case, the weights may vary depending on at least one of the intra prediction mode of the current block, the size of the current block, the shape of the current block, and the position of a predicted sample. For example, when combining one or more intra prediction modes, a prediction block may be constructed by calculating a weighted average of a value predicted using an intra prediction mode of the current block and a value predicted using a predetermined mode existing in the MPM list. When combining one or more intra prediction modes, a representative intra prediction mode may be determined. For example, a process (for example, transformation and scanning) adaptively performed based on the intra prediction mode of the current block may be performed based on the representative intra prediction mode. The representative intra prediction mode may be an intra prediction mode to which a large weight is assigned. Alternatively, the one or more intra prediction modes used for the combining may be a directional mode or a non-directional mode. In the combining of one or more prediction modes, a value predicted using one intra prediction mode and a value predicted using one inter prediction mode may be combined.

Intra prediction may be performed using one or more reference sample sets. For example, intra prediction for the current block may be performed using a weighted average of a block obtained by performing intra prediction on unfiltered reconstructed reference samples and a block obtained by performing intra prediction on filtered reference samples.

In the process of performing the intra prediction, a filtering process using neighboring reconstructed samples may be performed. Whether to perform the filtering process may be determined based on at least one of the intra prediction mode of the current block, the size of the current block, and the shape of the current block. The filtering may be included as one step in the intra prediction process. When performing the filtering, at least one of a filter tap, a filter coefficient, a filter shape, the number of reference sample lines to which filtering is to be applied, and the number of samples to which filtering is to be applied may vary depending on at least one of the intra prediction mode, the size, and the shape of the current block.

In the process in which the current block is divided into sub-blocks, the intra prediction mode for each of the sub-blocks is derived based on an intra prediction mode of a neighboring block, and intra prediction for each of the sub-blocks is performed based on the derived intra prediction mode, filtering may be applied to each of the sub-blocks within the current block. For example, a low-pass filter may be applied to the entire area of the current block. Alternatively, a filter may be applied to the sample located at the boundary of each sub-block.

When the current block is divided into sub-blocks and intra prediction is performed on a sub-block basis, each sub-block may be at least one of a coding/decoding block, a prediction block, and a transform block. For example, when the size of the current block is 64×64 and the size of the sub-block is 16×16, the intra prediction mode may be derived for each sub-block so that intra prediction can be performed for each sub-block. In this case, when one or more sub-blocks are further divided into smaller 8×8 or 4×4 blocks, each 8×8 or 4×4 block may be a transform block. In this case, the intra prediction mode of the 16×16 block may be used for prediction of each of the 8×8 or 4×4 blocks.

After performing the intra prediction to produce a prediction block, the filtering may be applied to the prediction block. For example, at least one of a low-pass filter and a bilateral filter may be applied. Whether to apply the filtering may be determined based on at least one of the intra prediction mode of the current block, a position of a prediction sample, the size of the current block, and the shape of the current block. Alternatively, the filtering may be applied only when a specific condition is met for each prediction sample (that is, each predicted sample). Multiple reference sample lines may be used when applying the filtering to the prediction block. For example, when filtering the prediction samples located at the boundary between the current block and the reference sample, the filtering may be performed using two or more adjacent reference sample lines.

Filtering may be applied to a prediction block obtained by performing intra prediction on the current block and to a block that is reconstructed using a residual block. For example, at least one of a low-pass filter and a bilateral filter may be applied. Whether to apply the filtering may be determined based on at least one of the intra prediction mode and the size and shape of the current block. Alternatively, the filtering may be applied only when a specific condition is met for each prediction sample (that is, each predicted sample).

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied an additional identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

The present invention may be used in encoding/decoding an image.

What is claimed is:

1. An image decoding method performed by an image decoding apparatus, the method comprising:

receiving partition information for a coding tree unit and size information;

partitioning a split target block in the coding tree unit into a plurality of coding units based on the partition information; and performing intra prediction for each of the plurality of coding units, wherein a partition type for the coding tree unit includes at least one of quad tree split, binary tree split and ternary tree split, wherein the partition information includes quad tree split information for the quad tree split and multi-type tree split information for the binary tree split and the ternary tree split, wherein the size information includes minimum size information of the quad tree split and information related to a minimum size of the binary tree split or a minimum size of the ternary tree split, wherein based on a multi-type tree depth of the split target block being equal to a maximum multi-type tree depth, the split target block is not split into a binary tree, wherein based on a multi-type tree depth of the split target block being equal to a maximum multi-type tree depth, the split target block is not split into a ternary tree, wherein based on a size of the split target block being equal to the minimum size of the binary tree, the split target block is not split into the binary tree, and wherein based on the size of the split target block being equal to two times as large as the minimum size of the ternary tree, the split target block is not split into the ternary tree.

2. An image encoding method performed by an image encoding apparatus, the method comprising:

partitioning a split target block in a coding tree unit into a plurality of coding units;

performing intra prediction for each of the plurality of coding units; and encoding image information including partition information for the coding tree unit and size information, wherein a partition type for the coding tree unit includes at least one of quad tree split, binary tree split and ternary tree split, wherein the partition information includes quad tree split information for the quad tree split and multi-type tree split information for the binary tree split and the ternary tree split, wherein the size information includes minimum size information of the quad tree split and information related to a minimum size of the binary tree split or a minimum size of the ternary tree split, wherein based on a multi-type tree depth of the split target block being equal to a maximum multi-type tree depth, the split target block is not split into a binary tree, wherein based on a multi-type tree depth of the split target block being equal to a maximum multi-type tree depth, the split target block is not split into a ternary tree, wherein based on a size of the split target block being equal to the minimum size of the binary tree, the split target block is not split into the binary tree, and wherein based on the size of the split target block being equal to two times as large as the minimum size of ternary tree, the split target block is not split into the ternary tree.

3. A transmission method for image data, the method comprising:

obtaining a bitstream for encoded image information, wherein the encoded image information is generated based on partitioning a split target block in a coding tree unit into a plurality of coding units, performing intra prediction for each of the plurality of coding units; and encoding image information including partition information for the coding tree unit and size information; and transmitting the image data comprising the bitstream, wherein a partition type for the coding tree unit includes at least one of quad tree split, binary tree split and ternary tree split, wherein the partition information includes quad tree split information for the quad tree split and multi-type tree split information for the binary tree split and the ternary tree split, wherein the size information includes minimum size information of the quad tree split and information related to a minimum size of the binary tree split or a minimum size of the ternary tree split, wherein based on a multi-type tree depth of the split target block being equal to a maximum multi-type tree depth, the split target block is not split into a binary tree, wherein based on a multi-type tree depth of the split target block being equal to a maximum multi-type tree depth, the split target block is not split into a ternary tree, wherein based on a size of the split target block being equal to the minimum size of binary tree, the split target block is not split into the binary tree, and wherein based on the size of the split target block being equal to two times as large as the minimum size of ternary tree, the split target block is not split into the ternary tree.

* * * * *